United States Patent [19]

Kuno et al.

[11] Patent Number: 5,006,999

[45] Date of Patent: Apr. 9, 1991

[54] REAL-TIME ROBOT CONTROL SYSTEM TRACKING BASED ON A STANDARD PATH

[75] Inventors: Toshitaka Kuno, Nagoya; Mitsuo Koide, Owariasahi; Masaru Nakano, Nagoya; Chisao Hayashi; Yoshito Kato, both of Aichi; Yasuo Ishiguro, Toyota, all of Japan

[73] Assignees: Toyota Jidosha Kabushiki Kaisha, Toyota; Kabushiki Kaisha Toyota, Aichi, both of Japan

[21] Appl. No.: 331,318

[22] Filed: Mar. 31, 1989

[30] Foreign Application Priority Data

Apr. 1, 1988 [JP] Japan .................................. 63-81787

[51] Int. Cl.⁵ .............................................. G05B 19/00
[52] U.S. Cl. ................................ 364/513; 219/124.34
[58] Field of Search ................... 364/513; 219/124.22, 219/124.31, 124.32, 124.33, 124.34, 125.1; 901/3, 42; 318/568.15

[56] References Cited

U.S. PATENT DOCUMENTS

| | | | |
|---|---|---|---|
| 4,380,696 | 4/1983 | Masaki | 219/124.34 |
| 4,642,752 | 2/1987 | Debarbieri et al. | 364/167 |
| 4,675,502 | 6/1987 | Haefner et al. | 219/124.34 |
| 4,831,316 | 5/1989 | Ishiguro et al. | 318/568.13 |

FOREIGN PATENT DOCUMENTS 0139006 6/1987 Japan.
0008906 1/1988 Japan.

*Primary Examiner*—Allen R. MacDonald
*Attorney, Agent, or Firm*—Finnegan, Henderson, Farabow, Garrett and Dunner

[57] ABSTRACT

This invention is a real-time tracking controller for a standard-path robot that detects a target point in advance, permitting higher-speed work. The robot uses both sensed data and previously taught data to accurately execute its task. Accurate control is obtained using target points corresponding to time intervals. Thus, even if the speed or path is changed during operation, accurate tracing is continuously executed.

14 Claims, 20 Drawing Sheets

FIG. 11 WORK SHAPE MEMORY 406

REAL-TIME ROBOT CONTROL SYSTEM TRACKING BASED ON A STANDARD PATH

BACKGROUND

This invention relates to an industrial robot that scans a work point with a shape sensor before the point is worked.

There are many types of industrial robots. Some of them have a sensor for scanning certain reference points or lines of a workpiece. In one control system for such robots, a sensor in front of a tool senses the reference points and detects any shape or setting error of the workpiece. Interpolation values for the standard path are sequentially corrected during the profile control using the detected errors. This control system, however, has a timing problem when applying the sensed data from the sensor to the correction of the interpolation values. Specifically, relating one point T1, when the sensor detects a work point, and another point T2, when the tool actually arrives at the detection point, in real-time is difficult because of variable factors, such as the working speed and delays in the servo system of the robot.

To solve this problem, the following method has been proposed: work-shape data detected by the sensor are stored in a first-in/first-out buffer from which the oldest data are taken to calculate interpolation values for the tool following the sensor (Japanese Laid-Open Patent Publication No. 26276/1988). In this method, the time for starting the path correction can be adjusted according to the working speed if the working speed of the robot is equal to the speed at which the work-shape data stored in the buffer is used. Thus, it permits precise profile control for various working speeds of the robot as long as the speed is constant during one operation.

This control system, however, cannot always achieve the accurate profile control: if the robot changes the working speed during one operation, the relationship between the timing for using the work-shape data in the buffer for the path correction and the actual working point of the robot no longer applies The working speed of robot may change during an operation for the following reasons.

(1) Generally, robots change the working speed at the beginning or the end of the operation to prevent unnecessary oscillations.

(2) The working speed must be adapted for various local conditions such as flats and corners.

(3) Robots used for laser cutting move fast on the flat and straight parts of the workpiece and move slow on curves to reduce the total working period. If the working speed is fixed, the robot must move slowly throughout the entire piece. Moreover, since the robot never moves on only one line during any operation, several standard paths are typically taught based on several teaching points. Thus, the path of the robot necessarily changes.

SUMMARY OF THE INVENTION

The present invention allows a robot to consistently execute an appropriate profile control regardless of changes in working speed or path for the robot during an operation.

As shown in FIG. 1, the control system is for an industrial robot R4. The robot R4 moves on a standard path that is determined from position data previously stored in the system, and has a hand R1 with a tool R2 and a work-shape sensor R3 provided in front of the tool R2 at a fixed distance for sensing a workpiece. The system comprises temporary storage means R5 for calculating and storing work-shape data by using data from the sensor R3, interpolation determination means R6 for interpolating a point on the standard path as a target position of the tool R2, selection means R7 for generating reference point data corresponding to the interpolation point on the standard path and for selecting the work-shape data that best match the reference point data, path correction means R8 for generating target position and posture data for the tool from the work-shape data received from the selection means R7, and robot control means R9 for controlling the tool R2 to trace a series of points corresponding to the target position and posture data from the path correction means R8. This control system is characterized by a robot that corrects the deviation from the standard path in real-time while the tool R2 is operating.

In this system, the standard path provides the processing order for the workpiece, the position of the tool R2 relative to the workpiece, and the working speed. The standard path is made from the position data stored in advance during a teaching operation by an operator.

The work-shape sensor R3 on the hand R1 can detect the distance between the sensor and the workpiece, or a workpiece shape (i.e., a direction of the normal vector of the work surface). The sensor R3 may be of the non-contact type (e.g., laser distance sensor) or the contact type (e.g., a wire probe sensor).

If the posture of the tool R2 is fixed, the robot R4 may be a simple two-axis type with two degrees of freedom: one for controlling the distance between the hand R1 and the workpiece and the other for movement perpendicular to the distance. The robot R4 may also be a multi-axis or multi-joint robot having, for example, five or six axes of rotation. In this case, the posture of the tool R2 can be adjusted in addition to the position. The work done by the tool R2 may be welding, painting, cutting, trimming, drilling, other laser processes, assembling, measuring dimensions, and inspection for surface defects or pinholes.

The temporary storage means R5 consists of a logical circuit and a memory that temporarily stores data detected by the sensor R3.

The interpolation determination means R6 selects an interpolation point on the standard path where the tool R2 will pass. The interpolation point reflects the position data that produce the standard path (e.g., the working speed and the path).

The selection means R7 generates a reference point corresponding to the interpolation point on the standard path. The reference point is used to select the work-shape data most suitable for the correction. For instance, the reference point could be the interpolation point on the standard path, or the terminal point of a vector where a starting point is a point on the standard path corresponding to the current tool position and the terminal point is the interpolation point on the standard path, when the starting point of the vector is the current tool position. In this case, the starting point on the standard path can be a point projected from the current tool position on the standard path. Therefore, the selection means R7 selects a work-shape data that is the nearest to the reference point to correct the path.

The path correction means R8 calculates and generates target position and posture data for the tool corresponding to the selected work-shape data by considering the predetermined relationships of position and posture between the workpiece and the tool.

The control means R9 controls the tool R2 to sequentially reach a series of points corresponding to the target data from the correction means R8 in the same manner as in the conventional control method.

The selection means R7 preferably comprises reference-line calculation means for calculating a reference vector from the work-shape data or the standard path, projection means for projecting a predetermined projecting point on the reference vector, and vector selection means for selecting the work-shape data with the least distance between the projected point and a predetermined comparison point on the reference vector.

A structure of the invention could be built in which the reference vector is determined from work-shape data; the projecting point is the reference point equivalent to an estimated tool position to be reached by the tool, the tool position being estimated from the standard path and an actual path; and the comparison point is the sensed data from the work-shape sensor.

The invention could also be constructed so that the reference vector is the standard path; the projecting point is the sensed data from the work-shape sensor; and the comparison point is a reference point equal to the interpolation point on the standard path.

Furthermore, the reference line may be either a vector connecting two adjacent sensed data, a vector connecting two sensed data at a predetermined interval, or a vector connecting the sensed-location data and tool tip-position data at the time when the sensed data is detected.

It is best if the temporary storage means R5 erases the old work-shape data to make room for the new target position data for the tool.

The robot R4 controls the hand R1 with the tool R2 as follows.

(1) The temporary store means R5 calculates and stores a work-shape data using the sensor R3 that proceeds the tool R2.

(2) The interpolation determination means R6 selects an interpolation point on the standard path followed by the tool R2.

(3) The selection means R7 generates reference point data corresponding to the interpolation point and uses the reference point data to select the work-shape data most suitable for the correction of the path.

(4) The path correction means R8 calculates a target position and posture for the tool R2 from the work-shape data, and the robot control means R9 controls the hand R1 so that the tool R2 traces a series of points.

FIG. 2 illustrates the process of calculating the target position and posture of the tool R2, the process including steps for obtaining a reference point Nd corresponding to the interpolation point Sd which should be reached by the tool R2 on the standard path S determining the working speed (i.e., the moving speed of the tool R2) and the path, selecting the work-shape data Wd that is the nearest to the reference point Nd, calculating the target position and posture of the tool R2 from the selected work-shape data Wd, and correcting the path of the tool R2.

If the working speed or the path is altered during one operation, such alteration directly affects the interpolation points on the standard path, so the tool R2 can exactly follow variable working speeds and variable paths.

EMBODIMENT

Figure 1:
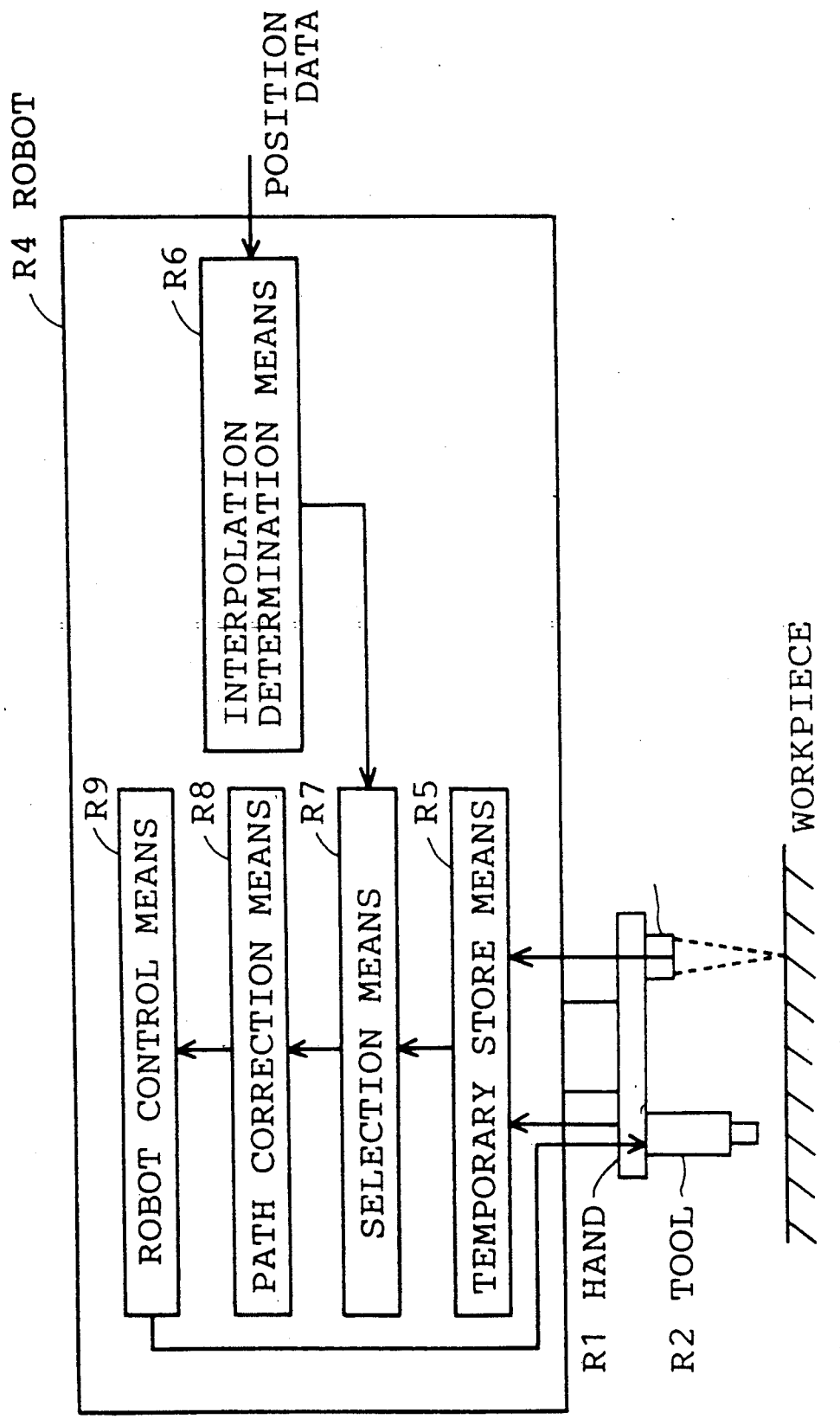
FIG. 1 shows a block diagram of the invention.
Figure 2:
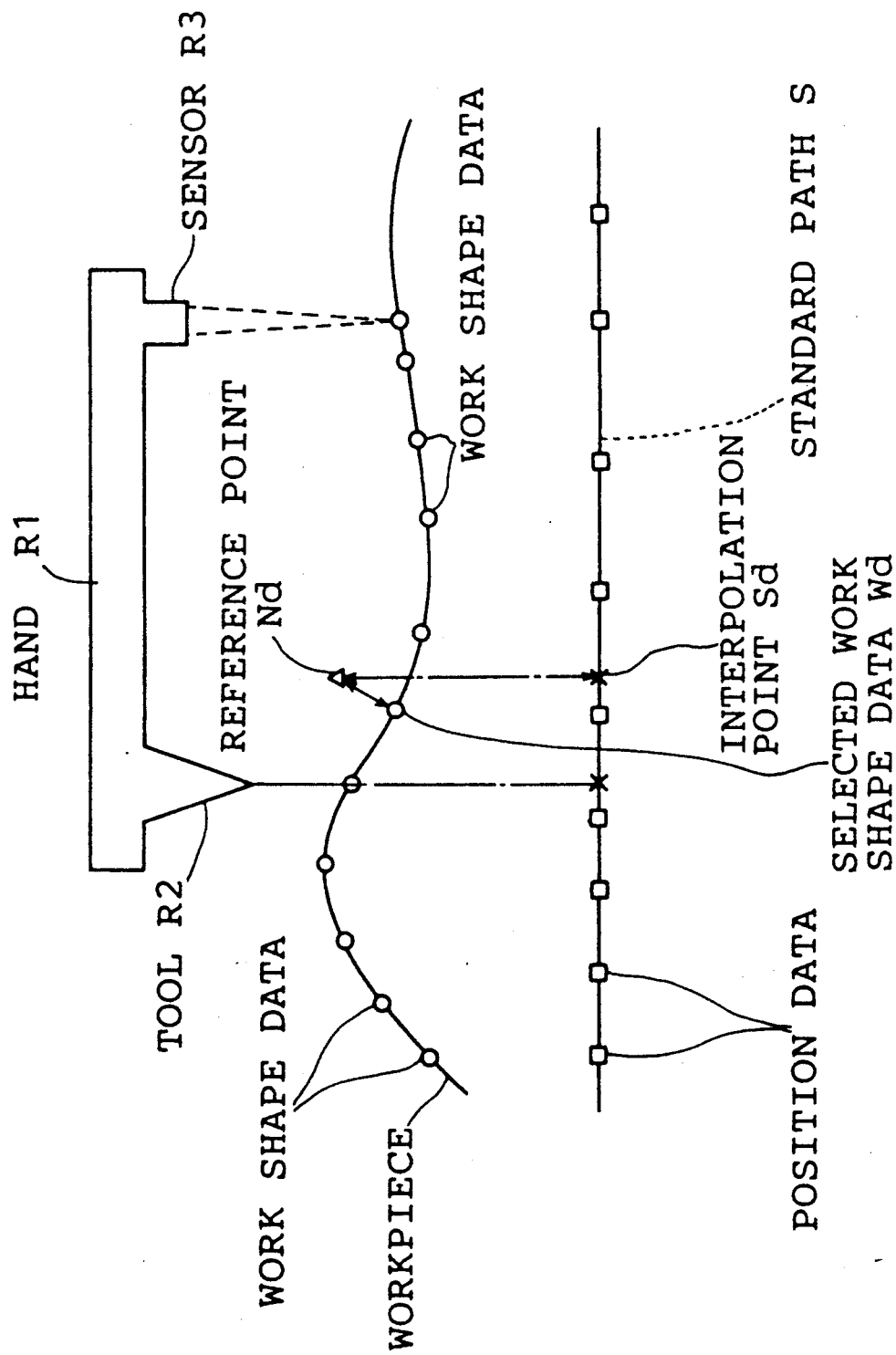
FIG. 2 shows, an example of the invention in operation.

This embodiment is a six-axis robot equipped with a tool for machining a workpiece using a laser beam and equipped with a sensor for sensing the shape of the workpiece at a position not yet worked. As shown in the perspective view of a robot system of FIG. 3, a robot 10 has a robot control section 12 for general control of the robot 10, a teaching box 14 on the robot control section 12 that enables an operator to teach the robot 10 in advance how to do a task, an actuator 16 with six axes of rotation that is controlled by the robot control section 12, a hand 18 with a laser tool 20 and a sensor head 22 for sensing the shape of a workpiece W, and a sensor controller 24 for processing information from the sensor head 22. The robot control section 12 has a terminal T and a printer P.

The tool 20 uses a high-power laser beam generated by an external device (not shown). A light guide 26 guides the laser beam to the tip of the tool 20 where the beam is spotted on the surface of the workpiece W. Other components of the laser tool 20, e.g., mirrors, prisms and lenses, are not important to the present invention, so they are not shown.

Figure 5:
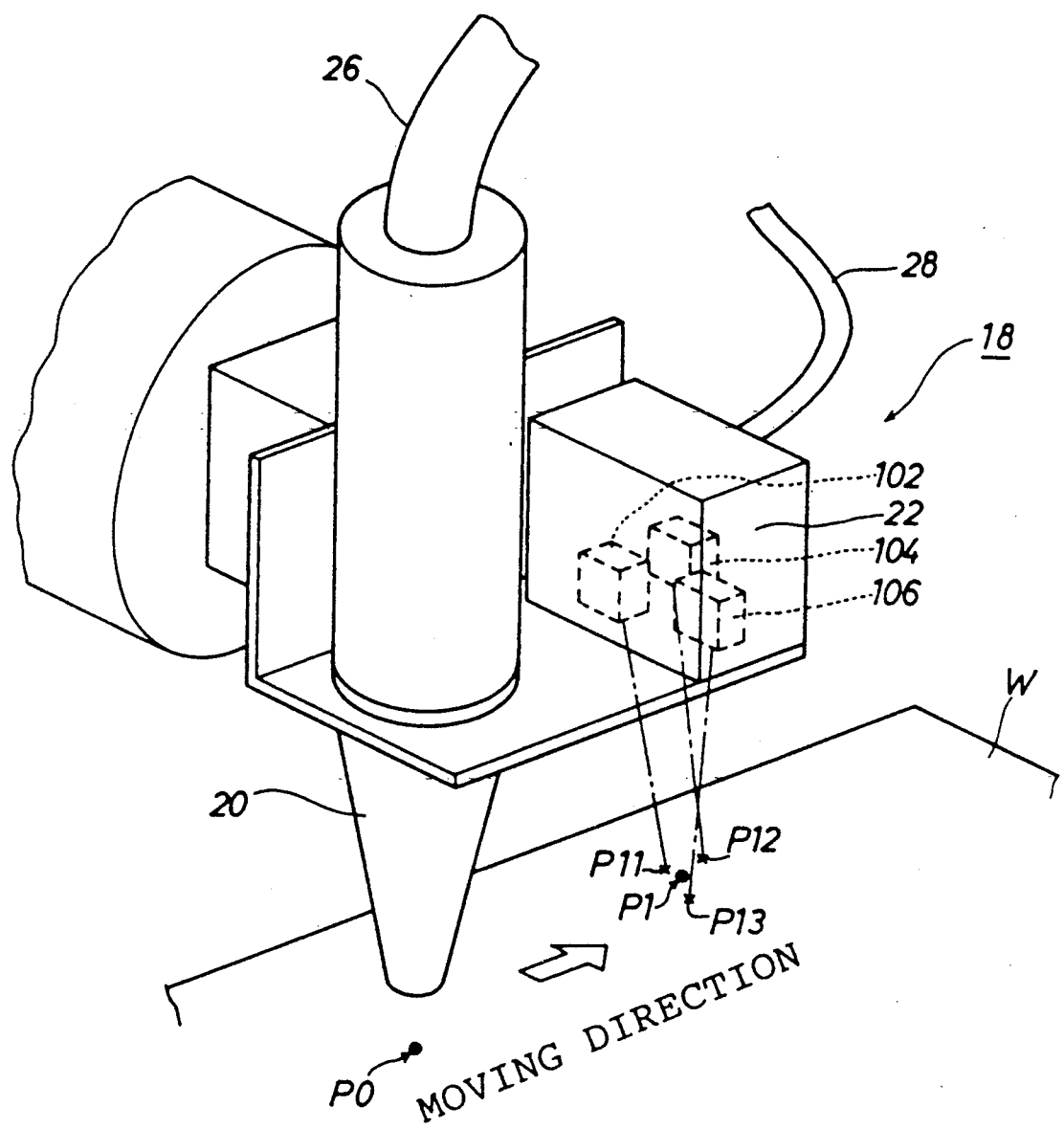
FIG. 5 shows a perspective view of the hand 18.

The sensor head 22 senses the position of the workpiece W relative to the sensor head 22, and also senses the posture of the workpiece W by means of a combination of three distance sensors (see FIG. 5). Data from the sensor head 22 are transmitted through a sensor cable 28 to the sensor controller 24 where the data are processed.

Figure 4A:
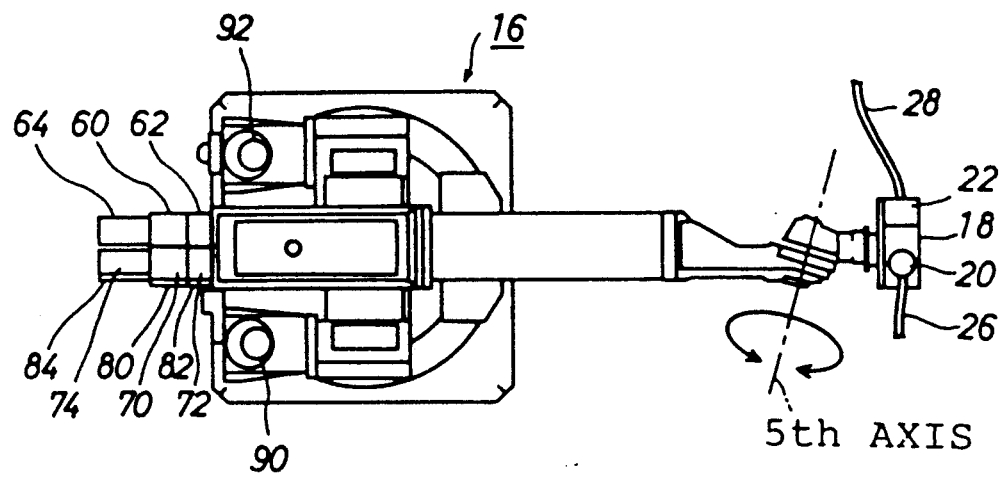
FIG. 4A shows a plan view of the actuator 16.
Figure 4B:
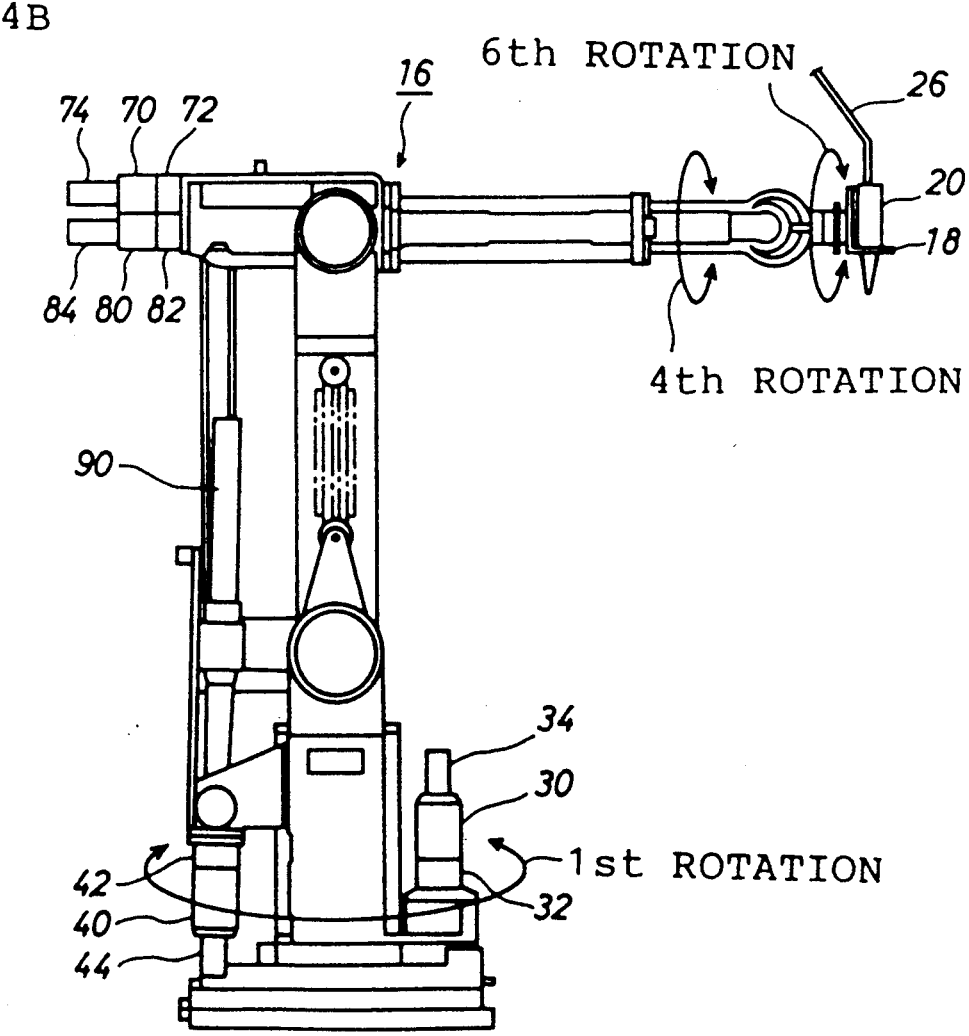
FIG. 4B shows a front view of the actuator 16.
Figure 4C:
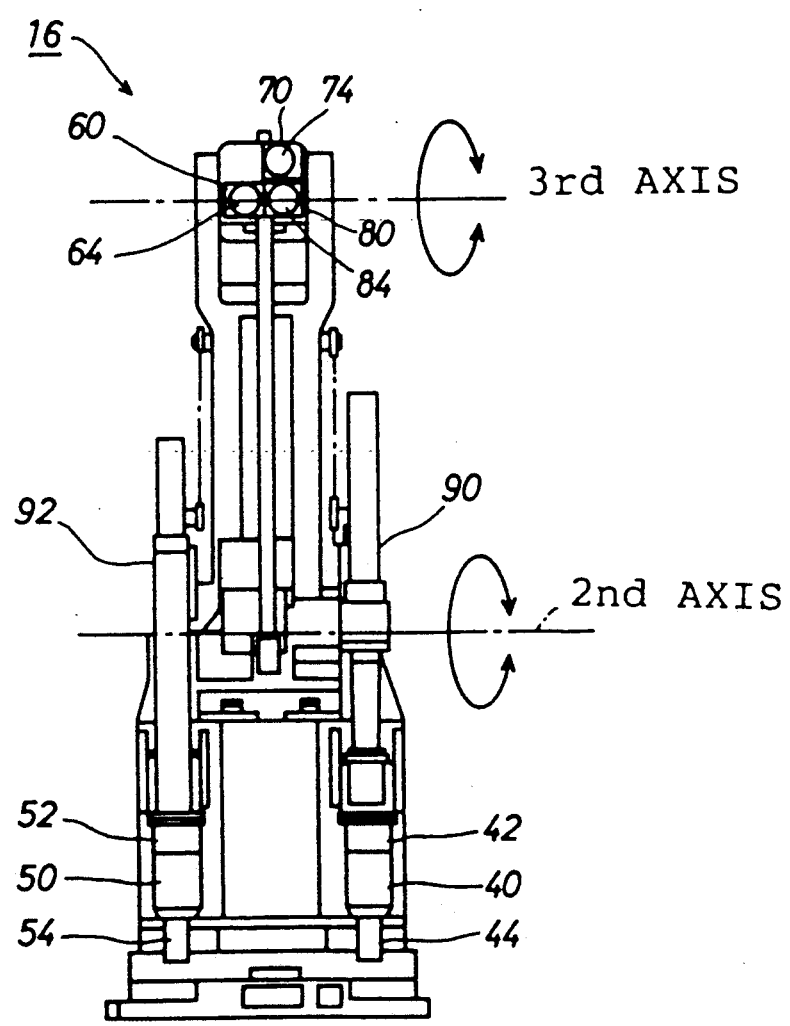
FIG. 4C shows a left-side view of the actuator 16.

The actuator 16, shown in FIGS. 4A–4C, has six axes of rotation: the first, second and third axes control the position of the hand 18 in relation to the workpiece W;

and the fourth, fifth and sixth axes control the posture of the hand 18 in relation to the workpiece W. Each axis has a motor, a brake, and an encoder (i.e., a rotation angle sensor): the first axis has a first motor 30, a first brake 32 and a first angle sensor 34; the second axis has a second motor 40, a second brake 42 and a second angle sensor 44; the third axis has a third motor 50, a third brake 52 and a third angle sensor 54; the fourth axis has a fourth motor 60, a fourth brake 62 and a fourth angle sensor 64; the fifth axis has a fifth motor 70, a fifth brake 72 and a fifth angle sensor 74; and the sixth axis has a sixth motor 80, a sixth brake 82 and a sixth angle sensor 84. Rotations about the second axis and the third axis by the motors 40 and 50 are transformed into linear movements by means of respective ball screw feeders 90 and 92, and the linear movements are transformed into rotations about the axes by means of parallel links. Rotations about the other axes are driven by the axes' respective motors via torque tubes, reduction gears, helical gears, and other transmitting members.

In FIG. 5, the laser tool 20 and the sensor head 22 are attached to the hand 18 with a preset distance between them. The relative positions of the tool 20 and the sensor head 22 are fixed regardless of the movement of the hand 18. The sensor head 22 has three distance sensors 102, 104 & 106. The hand 18 moves over the workpiece W in such a way that the sensor head 22 precedes the tool 20. In other words, the sensor head 22 senses a point P1 on a work surface at which the tool 20 will work after finishing its current work at point P0.

The sensor head 22 senses the point P1 using the three distance sensors 102, 104 & 106 to measure the distance and the direction of three points P11, P12 & P13 from the corresponding sensors 102, 104 & 106. The sensor controller 24 then calculates the position and inclination of the point P1 based on the measured result. The points P11, P12 & P13 are actually very close to the point P1 but are shown more distant in FIG. 5 to simplify the explanation.

Figure 6:
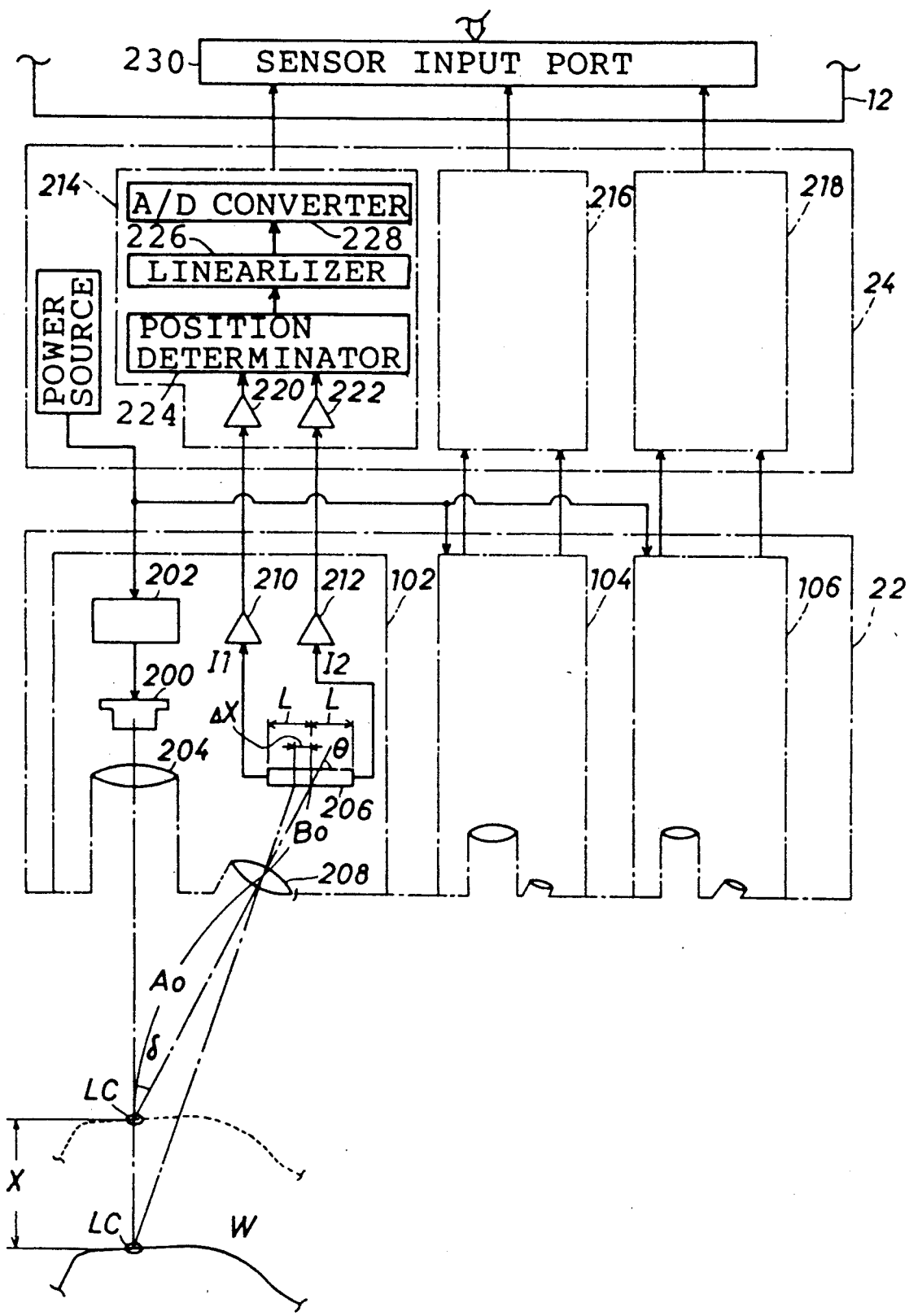
FIG. 6 is a block diagram of the sensor controller 24 with an example of it detecting a distance.

FIG. 6 shows a block diagram of the sensor head 22 and the sensor controller 24. Each distance sensor 102, 104 & 106 detects the distance to a surface point LC on the workpiece W by the following method (for brevity, this method is described for only one sensor 102). The distance sensor 102 includes a laser diode 200 for emitting a laser light with a wavelength of about 750 μm, a pulse modulator 202 for pulsating the laser light with a preset duty ratio, a collimator lens 204 for collimating the laser light, a one-dimensional PSD (Position Sensitive Device) 206 of length 2·L, an objective lens 208 for focusing the laser light reflected by the work surface on the PSD 206, and two pre-amplifiers 210 & 212 for converting the photo-induced electric current Io from the PSD 206 into corresponding voltages.

The PSD 206 is made of silicon photo-diodes in which a p-type resistant layer is provided on a high resistance silicon substrate (i-layer), two electrodes are provided on both ends of the layered structure for outputting signals, and a common electrode is provided at the surface of the high resistance silicon substrate (i-layer). When light is focused on a certain position of the p-type layer surface, electric current Io is generated there. The current Io is divided into two currents I1 and I2 which are sent out from the electrodes on opposite ends of the PSD 206. When the focused position is displaced by a distance X from the center of the PSD 206 having the length of 2L, the respective currents I1 and I2 sent from the PSD 206 to the preamplifiers 210, 212 are given by:

$$I1 = Io \cdot (L + \Delta X)/(2 \cdot L)$$

and $$I2 = Io \cdot (L - \Delta X)/(2 \cdot L) \quad (1).$$

Namely, the current Io is divided into currents I1 and I2 in inverse proportion to the resistance from the focused position to the respective end electrodes.

The optical system, including the laser diode 200, the collimator lens 204, the objective lens 208 and the PSD 206, is arranged so that:

(1) when the axis of the incident laser light and the axis of the reflected light make an angle δ, the reflected laser light passes the center of the PSD 206, and (2) in that case, an angle θ made by the reflected axis and the PSD 206 is set at such a value that the laser light reflected from the spotted point LC on the work surface focuses on the PSD surface irrespective of the position of the point LC.

Thus, a displacement X of the workpiece W (i.e. a change in the distance between the distance sensor 102 and the workpiece W) and the displacement ΔX of the focus point from the center of the PSD 206 have the following relationship:

$$\Delta X = (1/\cos\theta) \cdot \{Bo - (Ao \cdot f + f \cdot X \cdot \cos\delta)/\{(Ao - f) + X \cdot \cos\delta\}\} \quad (2)$$

where f is the focal length of the objective lens 208, Ao is the distance between the spotted point LC and the objective lens 208 when the incident axis and the reflected axis make angle δ, and Bo is the distance between the objective lens 208 and the center point of the PSD 206.

From equation (1) and a general equation $(1/f = 1/Ao + 1/Bo)$ representing a relationship between focal lengths, the following equation is derived:

$$\Delta x/L = (I1 - I2)/(I1 + I2) \quad (3)$$
$$= K \cdot x/(1 + \alpha \cdot x),$$

where
$K = ((\cos\delta) \cdot (Bo - f))/(L \cdot (\cos\theta) \cdot (Ao - f))$ and
$\alpha = (\cos\delta)/(Ao - f)$.

As shown by equation (3), the displacement X of the workpiece W with respect to the distance sensor 102 is found by measuring the output currents I1 and I2 from the opposite ends of the PSD 206. Calculations of equation (3) is performed in the calculation sections 214, 216 & 218 of the sensor controller 24 in this embodiment. Since all three calculation sections 214, 216 & 218 have the same construction, only section 214 will be described.

A position determinator 224 in the calculation section 214 receives the output currents I1 and I2 from the PSD 206 via respective input buffers 220 and 222 and calculates $(I1 - I2)/(I1 + I2)$. The position determinator 224 generates a signal that represents the calculation result and is proportional to ΔX/L, and sends the signal to a linearlizer 226, wherein the signal is corrected to be proportional to the displacement X of the workpiece W. The output signal of the linearlizer 226 is converted into a digital signal by an A/D converter 228 to be processed in a sensor input port 230 of the robot control section 12.

Figure 7:
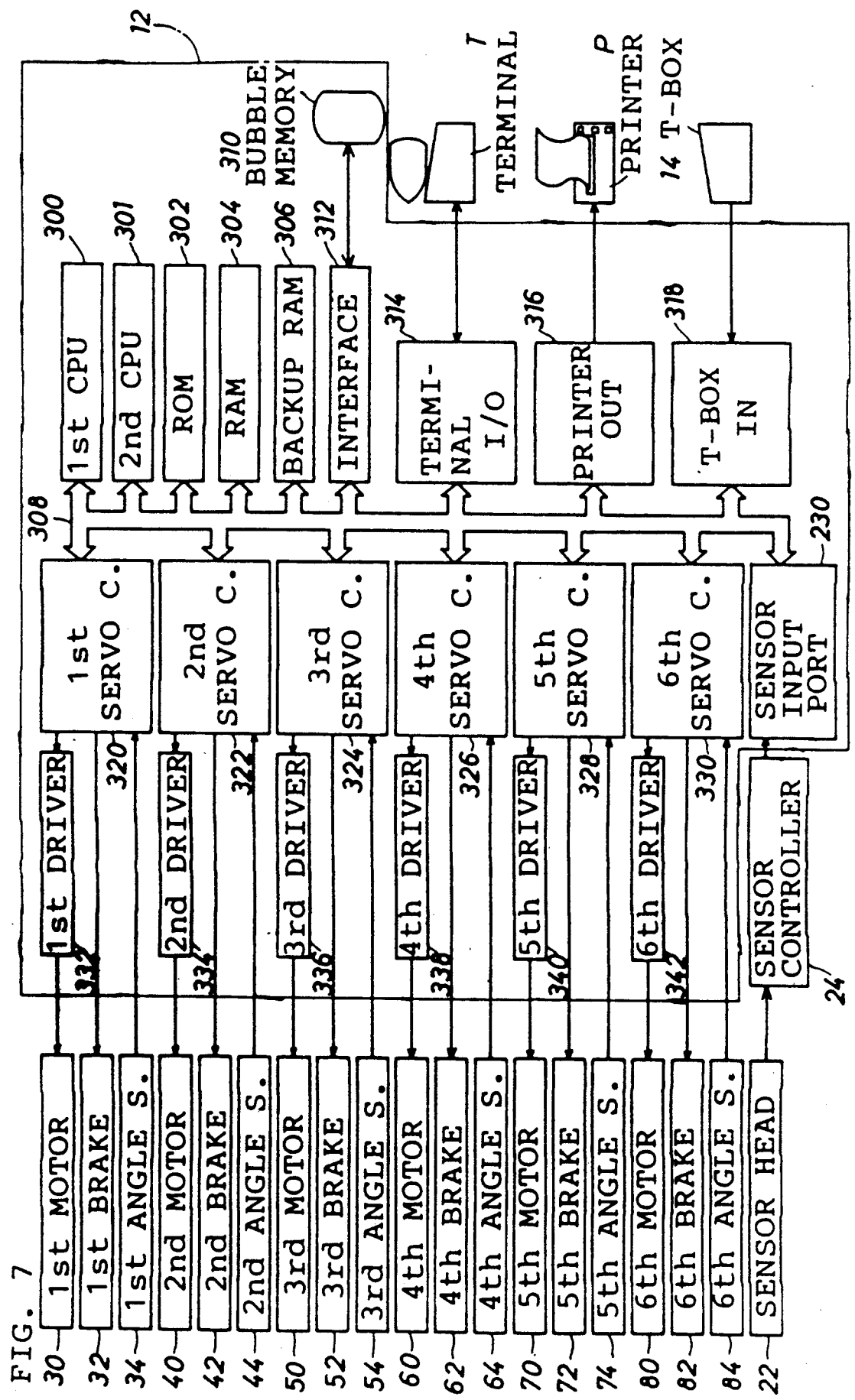
FIG. 7 is a block diagram of the robot controller 12.

In FIG. 7, the robot control section 12, which is a process controller for the six-axis actuator 16 and a teaching controller for the robot 10, is a microcomputer including a first CPU 300, a second CPU 301, ROM 302, RAM 304, backup RAM 306 and other electronic elements interconnected by a bus line 308, all of which are well-known, readily available devices. The other elements include a bubble memory 310 as an external memory device, a bubble-memory interface 312 for the bubble memory 310, a terminal I/O port 314 for a terminal T equipped with a CRT display and a keyboard, a printer output port 316 for a printer P, a T-box input port 318 for a teaching box (T-box) 14, the sensor input port 230 for the sensor head 22 (the sensor input port 230 generates an interrupt in the second CPU 301 at preset time intervals to transmit the signal from the sensor controller 24), and six servo circuits 320, 322, 324, 326, 328 & 330 for first through sixth axes, respectively.

Each servo circuit 320 through 330 is of the so-called intelligent type having a CPU. When target position data and target posture data for the tool 20 are sent from the first CPU 300 via the bus line 308, the circuits 320, 322, 324, 326, 328 & 330 drive motors 30, 40, 50, 60, 70 & 80 respectively via motor drivers 332, 334, 336, 338, 340 & 342 to move the tip of the tool 20 to the target position and to place the tool 20, or the hand 18, in a target posture. In the driving process, the angle sensors 34, 44, 54, 64, 74 & 84 send rotation angle data for the respective axes to the servo circuits 320 through 330. The circuits 320 through 330 also drive the brakes 32, 42, 52, 62, 72 & 82 as occasion demands in order to prevent the arm of the actuator 16 from falling down when the power source for the servo circuits 320 through 330, or for the motors 30, 40, 50, 60, 70 & 80, is turned off.

Figure 8:
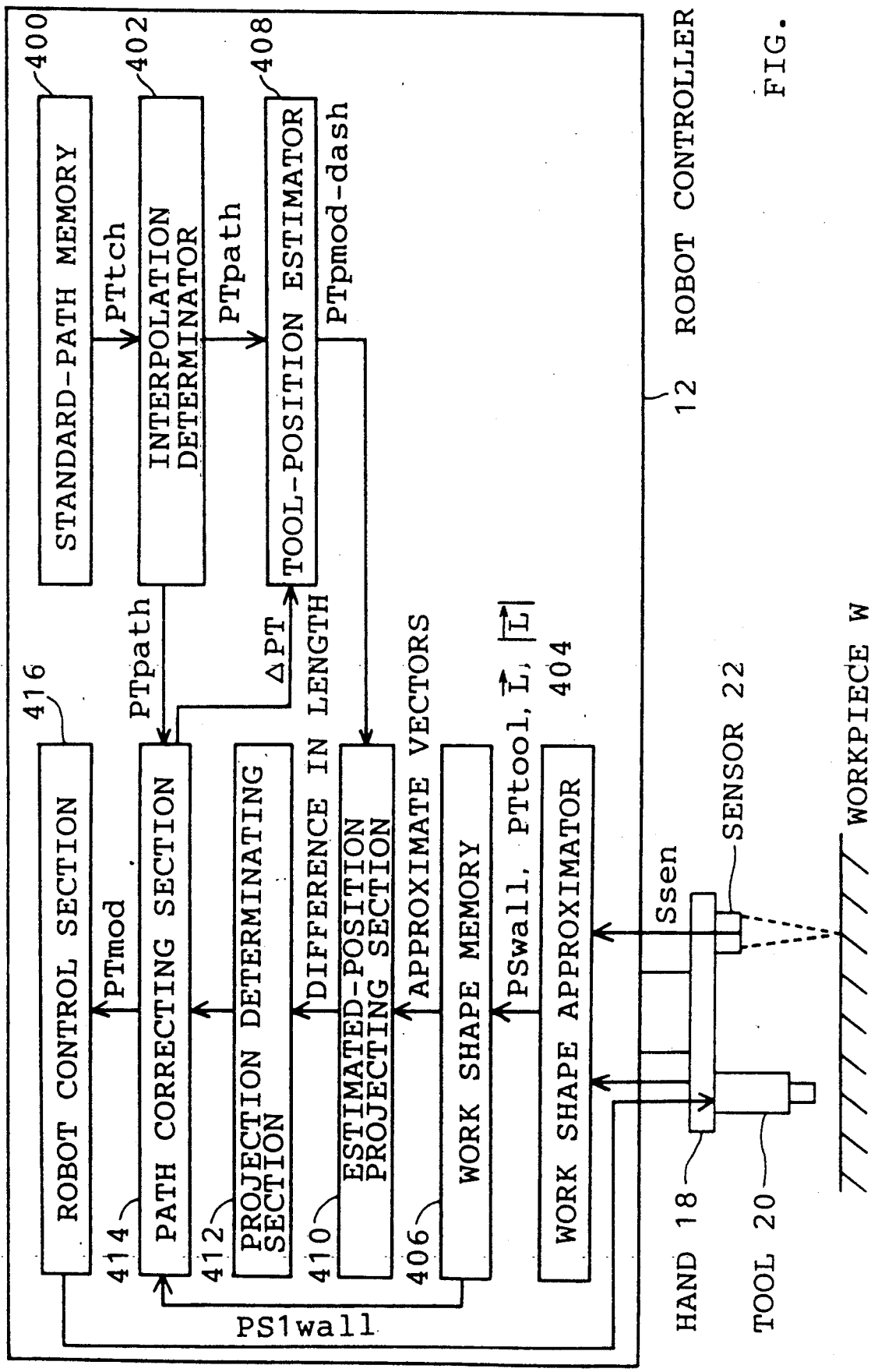
FIG. 8 is a block diagram of the first embodiment.

As shown in the schematic diagram of FIG. 8, the robot control section 12 comprises a standard path memory 400 for storing teaching point data PTtch as part of a standard path, the data PTtch being taught from the teaching box 14; an interpolation determinator 402 for generating target position data PTpath for the tool 20 to subsequently reach according to the teaching point data PTtch in the memory 400, the target position data PTpath being the interpolation point on the standard path; a work-shape approximator 404 for receiving sensed data Ssen about the workpiece W from the sensor 22 and frange-center data for the hand 18, and for calculating work-shape data PSwall, work-point data PTtool, a vector L (in the specification, vectors are expressed in bold lettering, e.g., L; in the drawings they are expressed as letters capped by arrows) from PTtool to PSwall, and the length $|L|$ of the vector L; a work-shape memory 406 for storing PSwall, PTtool, L and $|L|$; a tool-position estimator 408 for calculating an estimated tool position PTpmod-dash from the target position data PTpath from the interpolation determinator 402 and a correction $\Delta PT$ from a path-correcting section 414 (explained below); an estimated-position projecting section 410 for calculating several vectors IL by projecting PTpmod-dash to the vector L in the work-shape memory 406 which approximates the workpiece shape; a projection determinating section 412 for selecting the shortest vector IL; a path-correcting section 414 for calculating a modified data PTmod and the correction $\Delta PT$ from a workpiece point data PS1wall corresponding to the shortest vector selected by the projection determinating section 412, and from the target position data PTpath from the interpolation determinator 402; and a robot control section 416 for positioning the tool 20 according to the modified data PTmod.

Figure 9:
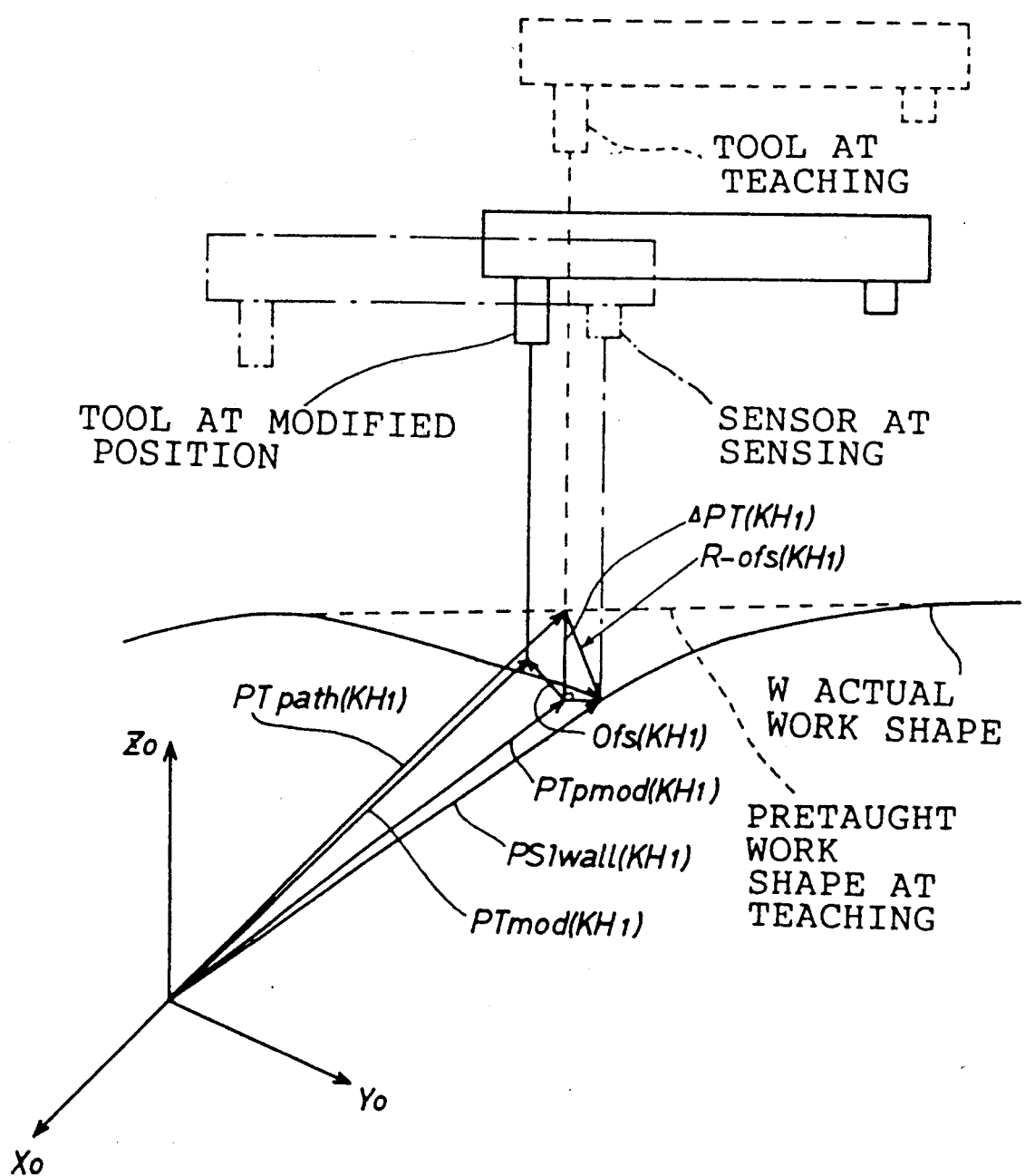
FIG. 9 illustrates the position relationship between the points used for the first embodiment.

FIG. 9 shows the relationships between the workpiece W, the hand 18, the tool 20, the sensor 22, and the values just introduced. By means of the robot control section 12, the robot 10 acts as follows.

(1) The work-shape data PSwall and the approximate vector L from the work-shape approximator 404 are stored in the work-shape memory 406.

(2) The tool-position estimator 408 calculates the estimated tool position PTpmod-dash from the target position data PTpath and the correction $\Delta PT$ previously obtained by the path correcting section 414;

(3) The estimated-position projecting section 410 projects the estimated tool position PTpmod-dash on the approximate vectors, and calculates the difference between the length of the approximate vector L and the distance to the projection point.

(4) The projection determinating section 412 selects the workpiece point data PS1wall which has the least difference between the vector length and the distance to the projection point.

(5) The path correcting section 414 calculates the correction $\Delta PT$ from the workpiece point data PS1wall, and produces modified data PTmod from PS1wall and the target position data PTpath.

(6) The robot control section 416 positions the hand 18 according to the modified data PTmod.

Figure 3:
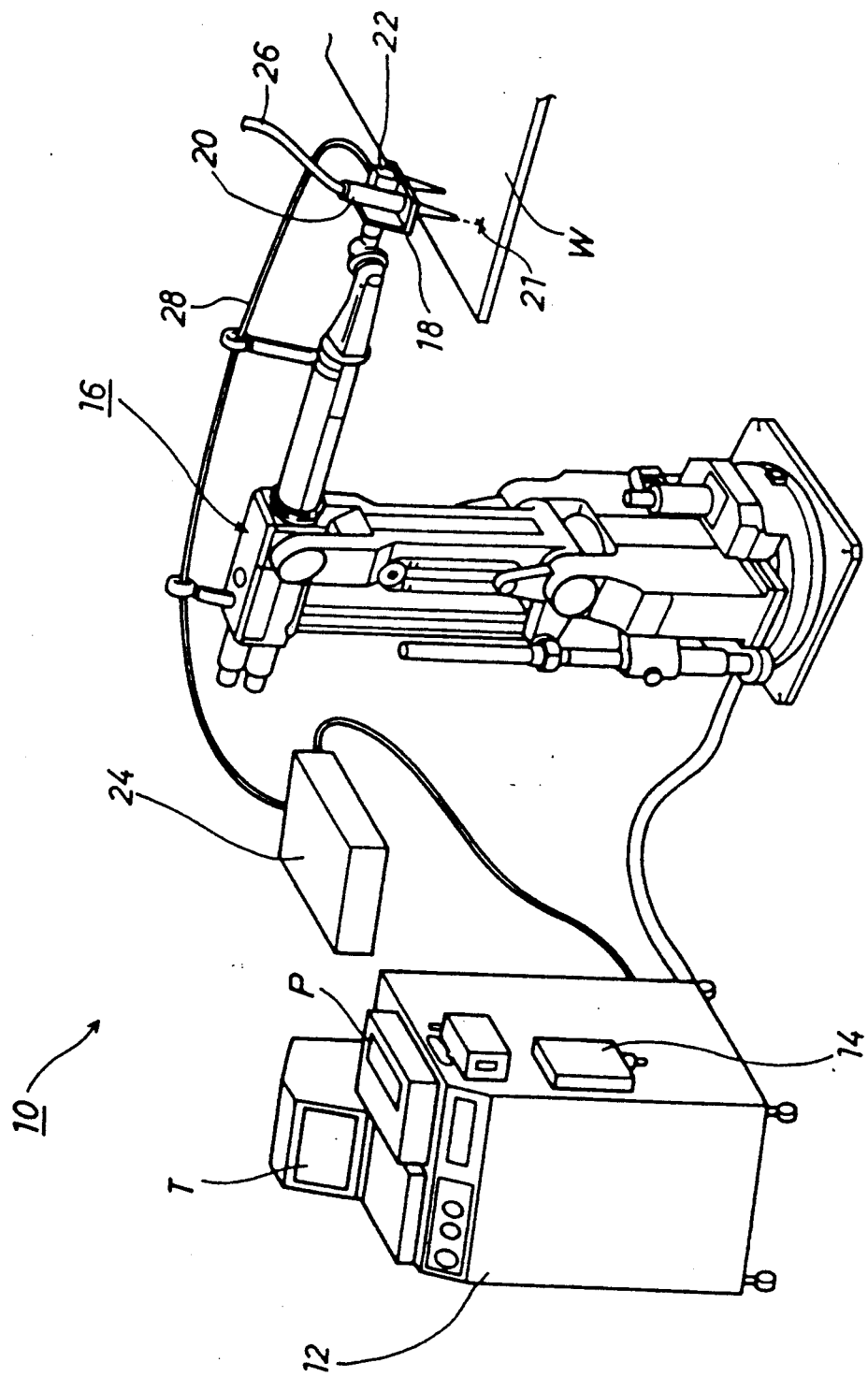
FIG. 3 shows a perspective view of one embodiment of the invention.
Figure 10:
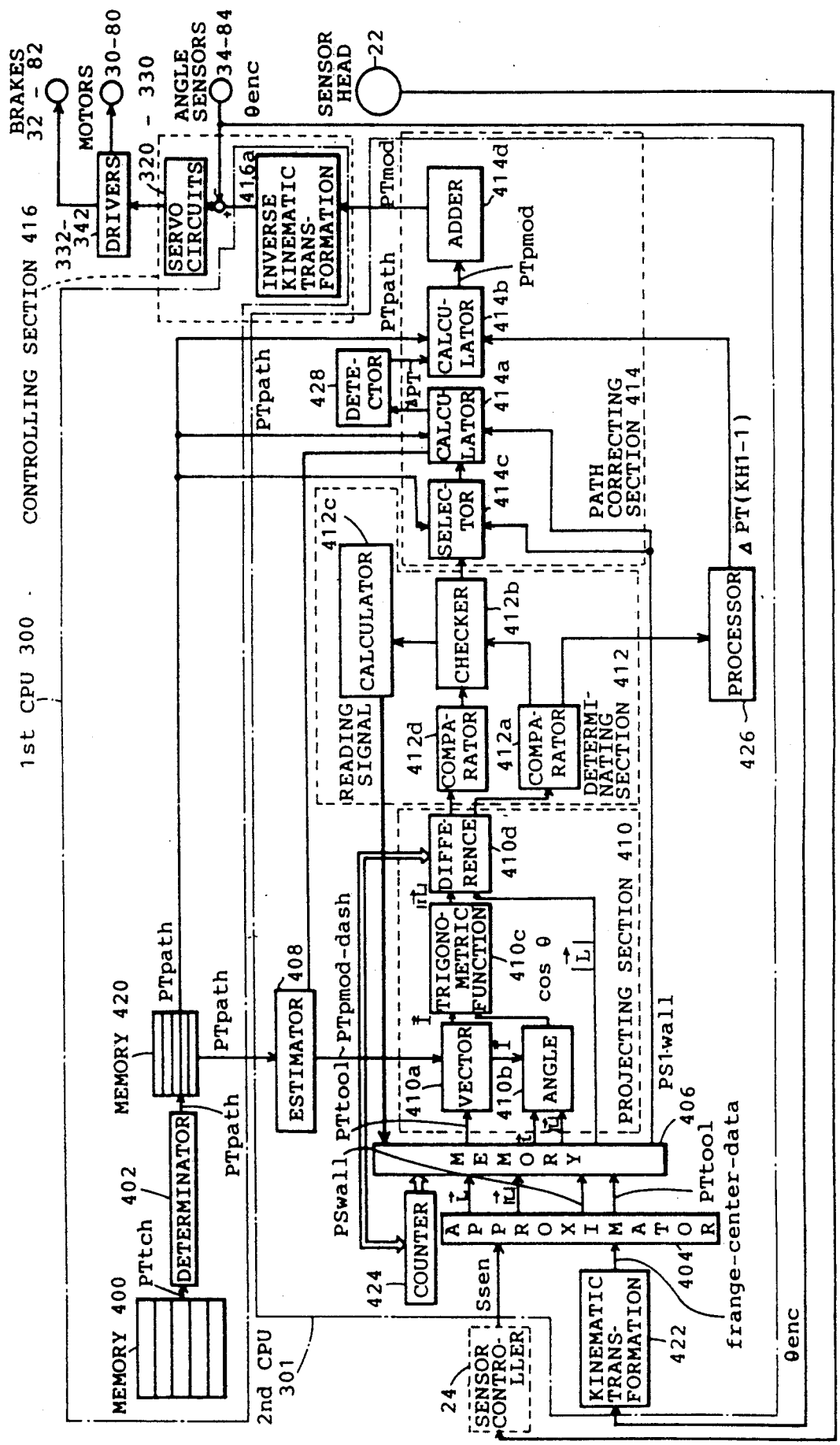
FIG. 10 is a circuit block diagram of the robot controller 12 in the first embodiment.
Figure 11:
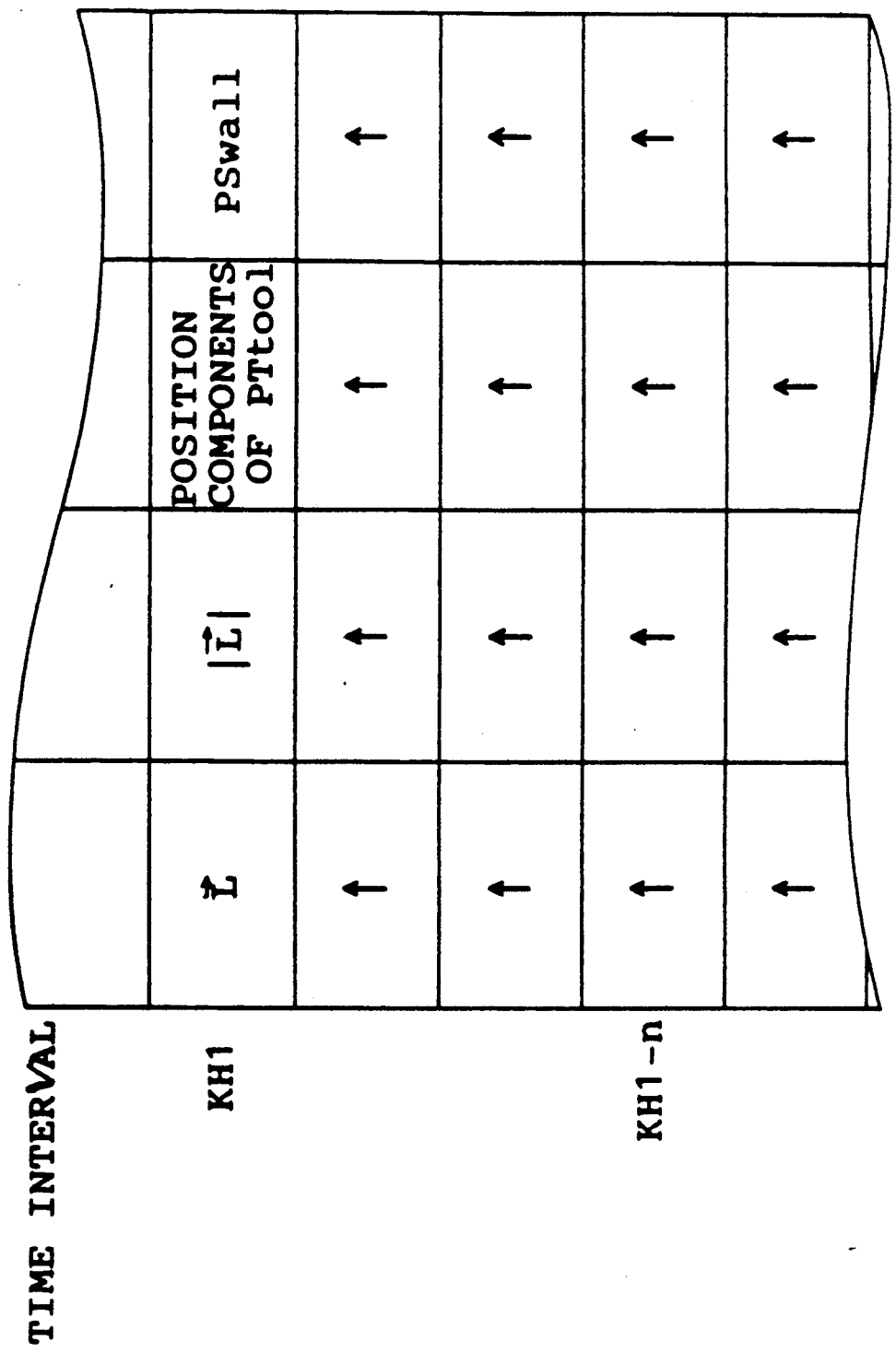
FIG. 11 depicts the work-shape memory 406.
Figure 12:
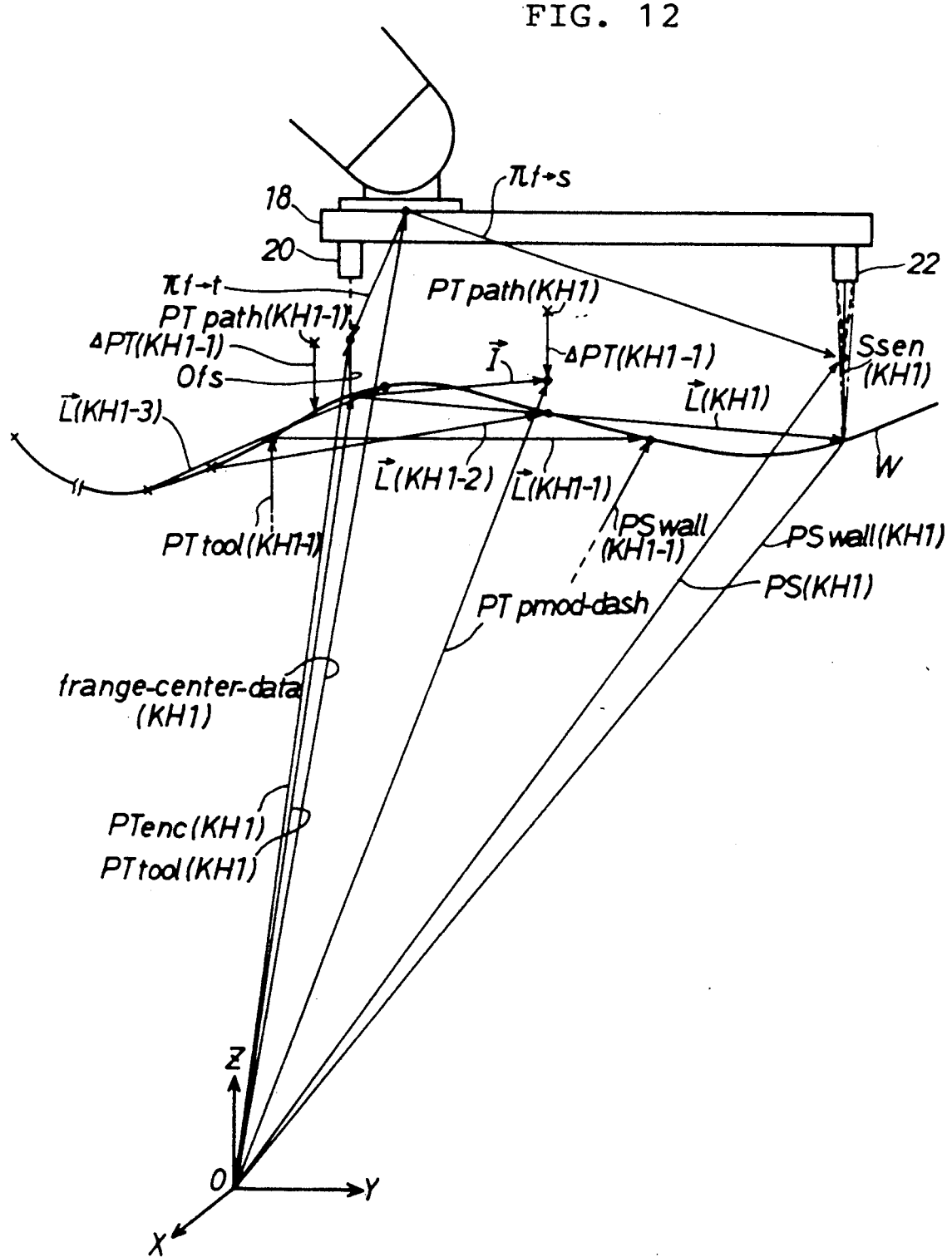
FIG. 12 explains the position relationship between the points used for the memory 406.

The robot control section 12 is explained using FIGS. 10 and 11. Before starting a particular job with the robot 10, an operator uses the teaching box 14 to teach the robot 10 which work points 21 (see FIG. 3) on the workpiece W the tool 20 should trace and what posture the tool 20 should take in advance of every work point 21. For example, an offset bar of a certain length is attached at the tip of the laser tool 20. The length of the offset bar is first determined to be an appropriate distance between the tip of the tool 20 and the work surface adapted for the specific job. The operator moves the hand 18 with the tip of the offset bar tracing a desired path on the workpiece surface, or sometimes off the surface, determining the position and posture of the tool 20 at every work point 21 (FIG. 3).

The position of every work point 21 with respect to a predetermined reference point of the robot 10, and the posture of the tool 20 at the work point 21 are stored in the form of a 4×4 matrix in the standard path memory 400. For example, teaching data at an m-th teaching point (work point) is represented by $$PTtch(m) = \begin{bmatrix} Nx & Ox & Ax & X \\ Ny & Oy & Ay & Y \\ Nz & Oz & Az & Z \\ 0 & 0 & 0 & 1 \end{bmatrix}, \quad (4)$$

where Nx, Ny, and Nz are x-y-z components of a normal vector; Ox, Oy, and Oz are x-y-z components of an orientation vector; Ax, Ay, and Az are x-y-z components of an approach vector; and X, Y, Z are x-y-z components of a position vector of the m-th teaching point.

Every component of the vectors is represented by a coordinate system O-XYZ with the origin O at the predetermined reference point of the actuator 16. The normal vector, the orientation vector and the approach vector are perpendicular to one another.

After the teaching operation, the robot 10 starts the particular job. The basic operations of the robot 10 are explained with reference to FIG. 10.

First the interpolation determinator 402 receives a teaching point PTtch (position data) from the standard path memory 400 in the babble memory 310, and then calculates position and posture data PTpath (target position data) that is then stored in the interpolation memory 420 in the RAM 304. Receiving the target data PTpath from the interpolation memory 420, the path correcting section 414 applies a correction $\Delta PT$ and a target offset Ofs on the target data PTpath in the target offset adder 414d to turn out modified data PTmod, as shown by the following calculation:

$$PTpmod = PTpath \cdot \Delta PT \qquad (4)$$

$$PTmod = PTpmod \cdot Ofs \qquad (5)$$

The target offset Ofs is a position of the work point 21 represented by a coordinate system originating on the tip of the tool 20 and represents a relative position of the work point 21 with respect to the tool tip. The correction $\Delta PT$ is calculated in the second CPU 301, as explained below. In this case, PTpath, $\Delta PT$, PTpmod, Ofs, and PTmod have the relationships shown in FIG. 9. Then, the modified data PTmod is sent to an inverse kinematic transformation circuit 416a in the robot control section 416 (FIG. 10), which decodes PTmod and generates rotation angle data $\theta$host for the six axes. Those operations are executed in the first CPU 300.

The six angle data $\theta$host are sent to the corresponding servo circuits 320 through 330, which control the motors 30, 40, 50, 60, 70 & 80 via the drivers 332 through 342 to move the work point 21 of the tool 20 to the modified target point represented by PTmod.

The calculation of the correction $\Delta PT$ in the second CPU 301 is explained using FIGS. 9 and 10. First, the work-shape approximator 404 receives frange-center-data for the tool 20 and sensed data Ssen representing the relative position of the sensor 22 and the workpiece W. The frange-center-data is obtained from a kinematic transformation circuit 422 by converting the rotation angle $\theta$enc of the six axes from the angle sensors 34, 44, 54, 64, 74 & 84. The conversion is done according to the following calculation.

$$\text{frange-center-data} = \Lambda[\theta enc] \qquad (6)$$

where $\Lambda$ is a kinematic transformation and [$\theta$enc] is an angle vector.

Then, the work-shape approximator 404 calculates sensor-end data PS and actual-position data PTenc from the frange-center-data as follows:

$$PS = (\text{frange-center-data}) \cdot \pi_{f \to S} \qquad (7)$$

$$PTenc = (\text{frange-center-data}) \cdot \pi_{f \to T} \qquad (8)$$

where $\pi_{f \to S}$ is a position and posture matrix representing the position of the sensor 22 with respect to the frange-end of the tool 20, and $\pi_{f \to T}$ is a position and posture matrix representing the position of the work point 21 with respect to the frange-end.

The work-shape approximator 404 receives from the sensor controller 24 the sensed data Ssen representing the relative position of the sensor 22 and the workpiece W and the shape of the workpiece W at the sensing point, and then converts that data Ssen into work-shape data PSwall representing the position and posture of the workpiece W with respect to the reference point O of the robot 10, using the sensor-end data PS.

$$PSwall = PS \cdot Ssen \qquad (9).$$

The sensed data Ssen may be an average of several samples taken within a very short sampling interval. The data PSwall is temporarily stored in the work-shape memory 406.

At the work-shape approximator 404, work-point data PTtool is calculated from the actual position data PTenc and the target offset Ofs by the following equation to store position components of the work-point data PTtool in the memory 406.

$$PTtool = PTenc \cdot Ofs^{-1} \qquad (10).$$

Here the target offset Ofs is changed according to information external to the robot 10 (e.g. machining conditions), or according to commands generated in the control program of the robot 10.

Using the x-y-z components (Xwall, Ywall, Zwall) of the work-shape data PSwall and the x-y-z components (Xtool, Ytool, Ztool) of the work-point data PTtool, a vector L spanning from PTtool to PSwall is defined as $$L = (Xwall, Ywall, Zwall) - (Xtool, Ytool, Ztool) \qquad (11).$$

This vector L and its length $|L|$ are sent to the work-shape memory 406.

A group of data synchronously obtained in the work-shape approximator 404 is stored in the memory 406 as illustrated in FIG. 11. When all of these synchronous data are prepared, a buffer counter 424 increments the counter by one. In FIG. 11, KH1 and KH1−n represent the current and immediately previous sample, respectively, out of n samplings, in the time series.

The tool-position estimator 408 estimates a target tool position PTpmod-dash using the target data PTpath and the correction $\Delta PT$ that has been calculated by a correction calculator 414a in the path correcting section 414 in the last correction process. The estimation is defined as:

$$PTpmod\text{-}dash = PTpath \cdot \Delta PT(KH1-1) \qquad (12)$$

where KH1−1 represents immediately previous sampling.

The change in the working speed is generally determined from the standard path. More specifically, the target tool position PTpmod-dash is calculated from the speed determined by the target position data PTpath and from the movement of the tool up to the last correction $\Delta PT(KH1-1)$. Furthermore, the most suitable work-shape data PSwall is selected from several work-shape data so that it is the nearest to the target tool position PTpmod-dash. Therefore, an appropriate target position can be determined according to the varying speed of the robot 10.

At the projector 410, a vector calculator 410a calculates a vector I spanning from PTtool to PTpmod-dash using the x-y-z components (Xpmod-dash, Ypmod-dash, Zpmod-dash) of the target tool position PTpmod-dash and the x-y-z components (Xtool, Ytool, Ztool) of the work point data PTtool.

$$I = (Xpmod\text{-}dash, Ypmod\text{-}dash, Zpmod\text{-}dash) - (Xtool, Ytool, Ztool) \quad (13)$$

The following process calculates PS1wall most proximate to PTpmod-dash.

Since it takes long time to calculate the position relationship for all the work-shape data PSwall, the enclosed interval [a, b], which is an area of time interval to be compared, is first set. An initial value of a is KH1−n which is the n-th time interval prior to the current time interval KH1, while an initial value of b is the current time interval KH1. n is determined according to working conditions, such as the working speed and the distance between the tool and sensor.

In an angle calculator 410b, an angle $\cos\theta$ between I and L(a) is calculated from a vector L at the time interval a which is read from the memory 406, L(a), and the vector I, using formula (15).

$$\cos\theta = (L(a)\cdot I)/(|L(a)|\cdot|I|) \quad (15)$$

where the vector L is marked as L(a) to distinguish it from data for other time intervals. Other variables may be similarly marked.

In a trigonometric function calculator 410c, a length $|IL(a)|$ of a vector IL(a), which is a projection of I on L(a), is obtained from I and $\cos\theta$, which is calculated in formula (15), using formula (16).

$$|IL(a)| = |I|\cdot\cos\theta \quad (16)$$

In a difference calculator 410d, the difference between $|IL(a)|$ calculated by formula (16) and $|L(a)|$ of L(a) is obtained, using formula (17).

$$f(a) = |L(a)| - |IL(a)| \quad (17)$$

Next, using the data for the time interval b stored in the memory 406, f(b) is calculated by repeating the operations performed by the vector calculator 410a through the difference calculator 410d.

Then, the values of f(a) and f(b) calculated in the projecting section 410 are sent to a difference comparator 412a in the determinating section 412, and are compared to the conditions in formula (17b).

$$f(a) < |L|$$

$$f(b) > 0 \quad (17b)$$

If formula (17b) is not satisfied, the control proceeds to the abnormality processor 426, and ΔPT (KH1−1) calculated by the correction calculator 414a for the previous path correction is transferred as ΔPT to a calculator 414b for calculating a path-indication value.

If formula (17b) is satisfied, a checker 412b that checks an enclosed interval compares the enclosed time intervals a and b using formula (18).

$$b - a \leq 1 \quad (18)$$

If formula (18) is satisfied, PSwall shown in FIG. 11, which is a time interval with the smaller value of f(x) for the time intervals a and b, is set as PS1wall, which is used for path correction.

On the other hand, if formula (18) is not satisfied, a calculator 412c, which calculates a center point of the enclosed interval, calculates center point c between the time intervals a and b.

Then, a reading signal is sent to the memory 406 so that f(c) for the center point c is obtained by repeating the operations from the calculator 410a to the calculator 410d in the projecting section 410.

A difference comparator (2) 412d examines f(c) for the center point c. If f(c)>0, b is replaced by c; if f(c)<0, a is replaced by c. All of these processes are repeated to obtain PS1wall used for path correction. PS1wall selected at the time interval KH1 can also be obtained as follows.

When a value KH2 at which $|L(KH2)| - |IL(KH2|KH1)|$ is smallest exists, PS1wall (KH1) may be determined by interpolating from the three work-shape data, PSwall(KH2−1), PSwall(KH2) and PSwall(KH2+1). For example, only the position vectors are calculated by the following interpolation.

$$\alpha1 = (|PSwall(KH2-1) - PTpath(KH1)|)^{-1} \quad (19)$$

$$\alpha2 = (|PSwall(KH2) - PTpath(KH1)|)^{-1} \quad (20)$$

$$\alpha3 = (|PSwall(KH2+1) - PTpath(KH1)|)^{-1} \quad (21)$$

where PSwall is a position vector of PSwall, and PTpath is a position vector of PTpath.

If the following equations are satisfied:

$$\Gamma1 = \alpha1/(\alpha1+\alpha2+\alpha3),$$

$$\Gamma2 = \alpha2/(\alpha1+\alpha2+\alpha3), \text{ and}$$

$$\Gamma3 = \alpha3/(\alpha1+\alpha2+\alpha3),$$

a position vector PS1wall of PS1wall is obtained using the following formula.

$$\begin{aligned}PS1wall(KH1) = &\Gamma1\cdot PSwall(KH2-1) + \Gamma2\cdot PSwall(KH2)\\&+\Gamma3\cdot PSwall(KH2+1)\end{aligned} \quad (22)$$

PS1wall is selected because the interval of the output of target data from the robot controller 12 to the servo circuits 332 through 342 is longer than the interval of the input of the position and shape data of the work point from the sensor controller 24, or because the working speed of the robot 10 changes from low to high. In other words, the memory 406 generally stores one or more work-shape data. Therefore, optimum data should be selected from a large selection of data.

When the robot controller 12 is thus constructed, proper target position is determined even when the working speed of the robot changes. For example, when the number of data generated by the sensor controller 24 and the number of data generated by the robot controller 12 are nearly equal, and the working speed of the robot 10 changes from low to high during operation, information about the workpiece W at the desired point may be missing. But, in this embodiment, since robot control data are generated by interpolating sensed data on scarcer points, this problem will not occur.

When the data PS1wall selected from the memory 406 is generated, the difference R-ofs between the data PS1wall and the target data PTpath previously calculated by the memory 420 is obtained as follows.

$$R\text{-}ofs = PTpath^{-1} \cdot PS1wall \qquad (23)$$

In a correction selector 414c, a matrix $\Delta PT$ having nonzero components only in the cells corresponding to those sensed by the sensor 22 is obtained using the data of R-ofs as follows.

For example, (1) when only the Z component distance in the tool coordinate system is sensed;

$$\Delta PT = \begin{bmatrix} 1 & 0 & 0 & 0 \\ 0 & 1 & 0 & 0 \\ 0 & 0 & 1 & Z \\ 0 & 0 & 0 & 1 \end{bmatrix}. \qquad (24)$$

(2) when only the Y component distance in the tool coordinate system is sensed;

$$\Delta PT = \begin{bmatrix} 1 & 0 & 0 & 0 \\ 0 & 1 & 0 & Y \\ 0 & 0 & 1 & 0 \\ 0 & 0 & 0 & 1 \end{bmatrix}. \qquad (25)$$

(3) when the tool posture and only the Z component distance only are sensed;

$$R - ofs = PTpath^{-1} \cdot PS1wall \qquad (26)$$

and $$\Delta PT = \begin{bmatrix} & & & 0 \\ \boxed{R - ofs} & & 0 \\ & & & Z \\ 0 & 0 & 0 & 1 \end{bmatrix} \qquad (27)$$

The correction $\Delta PT$ thus obtained is sent in the abnormality detector 428 and is compared with the preset value $\beta$.

When the amount $|\Delta PT|$ of $\Delta PT$ is greater than $\beta$, an abnormality process (e.g., an emergency stop of the robot operation) is executed because the robot 10 might go astray.

On the other hand, if $|\Delta PT|$ is smaller than $\beta$, the calculator 414b uses $\Delta PT$ to obtain PTpmod from formula (4).

When the posture component is included in the correction components of $\Delta PT$ and one movement is long, vibrations may occur, so the following processes are executed.

(1) A main-shaft rotation angle $\theta$ is obtained from the two matrices of PTmod(KH1) and PTmod(KH1−1). When this angle $\theta$ is greater than the angle $\alpha$ operable at the maximum speed of the robot 10, $\theta$ is replaced by $\alpha$ to make new data PTmod(KH1).

(2) When the main-shaft rotating angle is, for example, less than 2°, the posture is not corrected.

Figure 13:
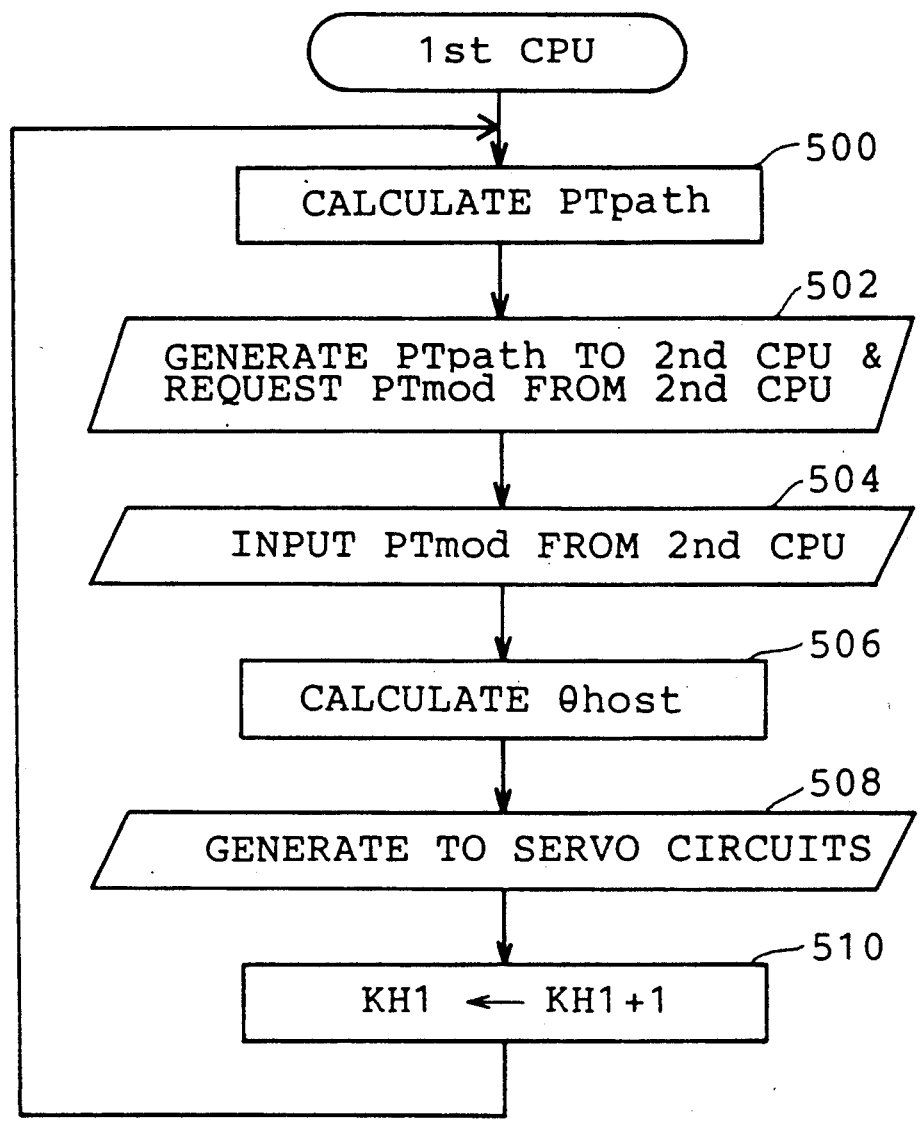
FIG. 13 is a flow chart of the processes in the first CPU 300.
Figure 14:
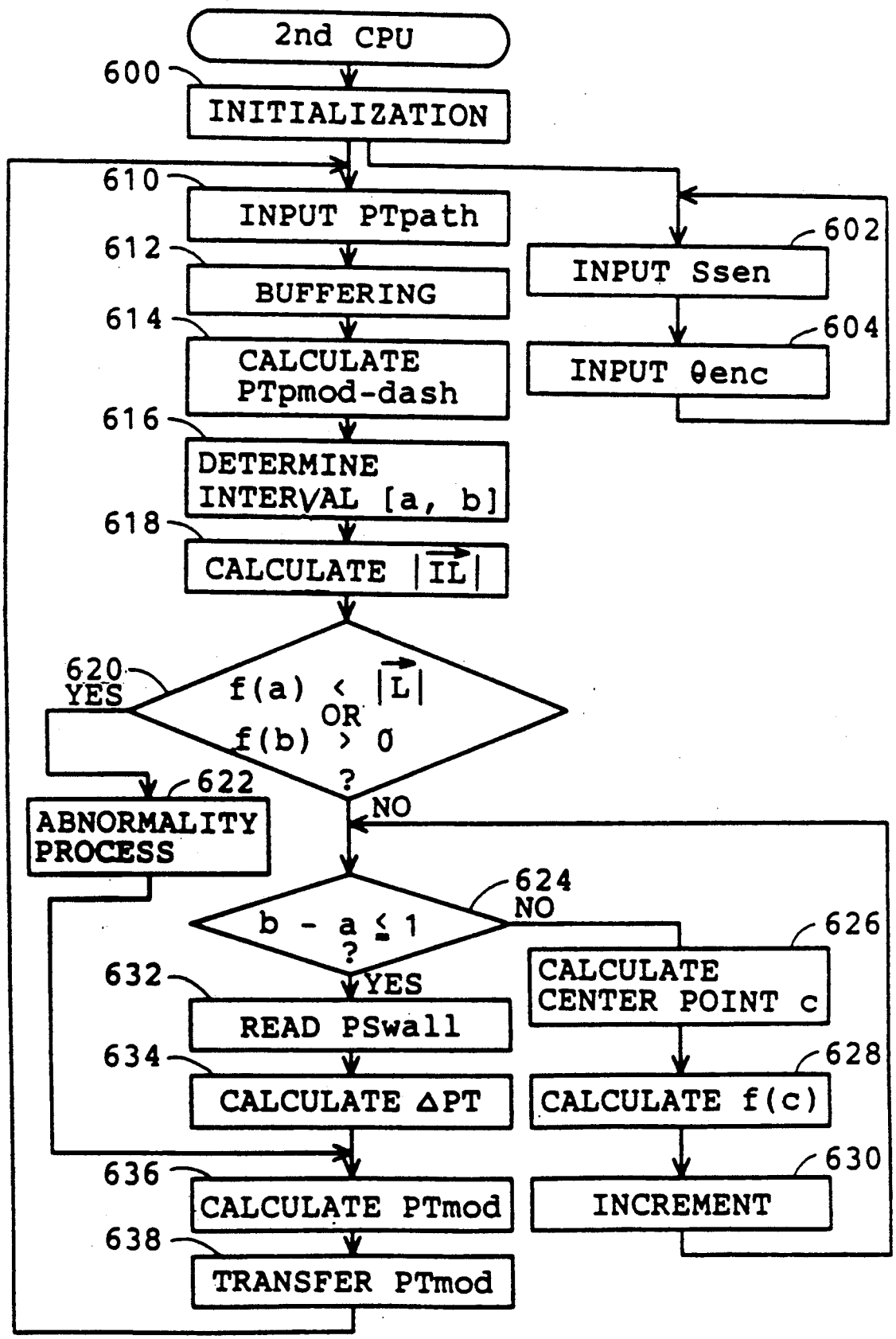
FIG. 14 is a flow chart of the processes in the second CPU 301.

These processes of the first CPU 300 and the second CPU 301 are illustrated in the flowcharts in FIGS. 13 and 14.

The robot controller 12 in this embodiment includes the two CPUs 300 and 301, shown in FIG. 7, which cooperate in synchrony with each other. FIG. 13 is a flowchart showing the flow of operation in the first CPU 300; FIG. 14 is a flowchart for the second CPU 301.

When the robot 10 starts working, the first CPU 300 sequentially executes the following processes.

Step 500: PTpath at time interval KH1 is calculated by interpolating the position data PTtch on the standard path stored in the memory 400.

Step 502: PTpath is sent to the second CPU 301 to request the modified data PTmod from the second CPU 301.

Step 504: PTmod is received from the second CPU 301.

Step 506: PTmod is decoded into target rotation angles $\theta$host for each axis.

Step 508: The angles $\theta$host are sent to the servo circuits 320 through 330 for the respective axes.

Step 510: KH1 is incremented by one to repeat steps 500 to 510 for next time interval.

The second CPU 301 executes the following processes. Steps 602 and 604, and steps 610 through 638 are executed in parallel by multi-task processing. Steps 602 and 604 are executed in one time cycle of the sensor controller 24, while steps 610 through 638 are executed in one time cycle of the robot controller 12.

Step 600: The second CPU board is initialized.

Step 602: The position and shape data Ssen of the sensing point are received from the sensor controller 24.

Step 604: Rotation angle data $\theta$enc for each axis are received from the angle sensors 34, 44, 54, 64, 74 & 84 at the same time when the sensor 22 starts sensing.

Step 610: PTpath is received from the first CPU 300.

Step 612: The actual PTenc on the work point, position components of PTtool, PSwall, and L spanning from PTtool to PSwall, and $|L|$ are obtained according to the formulas above, and then stored in the area of the memory 406 corresponding to KH1.

Step 614: PTpmod-dash is obtained from PTpath, and the correction $\Delta PT$ used for the previous path correction in the formulas above.

Step 616: A data-searching interval [a, b] for selecting PS1wall from the memory 406 is obtained. As described above, the initial values are: a=KH1−n, and b=KH1.

Step 618: PTtool is read from the memory 406, and the vector I spanning from PTtool to PTpmod-dash and its length $|I|$ are obtained according to the formulas above. Further, L(a) and L(b) are read from the memory 406, and $\cos \theta$ made by I and L(a), L(b) is obtained according to the formulas above.

Then, the vectors IL(a) and IL(b) which is a projection of I on L(a), L(b) and their lengths $|IL(a)|$ and $|IL(b)|$ are obtained according to the formulas above.

Step 620: If at the data-searching interval [a, b], $f(a) < |L|$, or $f(b) > 0$, then the control proceeds to step 622, where the abnormality process is executed; otherwise, the control proceeds to step 624.

Step 622: The previously calculated $\Delta PT(KH1-1)$ remains as $\Delta PT$ for the current process, and the control proceeds to step 636.

Step 624: If the work-shape data most proximate to PTpmod-dash has been found, the control proceeds to step 632; otherwise it goes to step 626. The test condition for this, $b-a \leq 1$, is satisfied when both end points of the searching interval are at the same point, or when they are adjacent.

Step 626: The enclosing method is used to quickly check within the search interval. In this way, the center point of the data-searching interval [a, b] is found.

Step 628: f(c) is obtained at the center point c.

Step 630: If $f(c)>0$, c is replaced by new b. If $f(c)<0$, c is replaced by a new a. Then the control returns to step 624.

Step 632: PSwall for the time interval selected from the memory 406 is read, and this PSwall is assigned to PS1wall.

Step 634: The difference R-ofs between the selected PS1wall and PTpath is found using the formulas above. Using R-ofs and correction selector 414c, the correction $\Delta PT$ is found using the formulas above to check for abnormalities with the abnormality detector 428.

Step 636: The modified data PTmod is calculated from PTpath, $\Delta PT$, and a target offset ofs.

Step 638: PTmod is transmitted to the first CPU 300, and the control returns to step 610.

The robot 10 works while sensing the point on the work for the next operation by repeating the processes above.

The this design seems to require memory with infinite capacity for storing the position and posture on the working point. In fact, this problem does not occur because data are held in a ring buffer.

In the prior-art robot, the robot is operated by sending the target data interpolated in the interpolating point generator directly to the robot controller.

In this embodiment, on the other hand, working point data is revised in the correcting section based on sensed information to obtain a new path for controlling the robot.

The present embodiment with the above constitution has the following effects.

(1) The robot can do high-speed work because the target point is detected in advance. Specifically, the working speed of a robot controlled by the prior-art sensor is 50 to 100 mm/sec at most, while a robot using this invention has a working speed of 500 mm/sec.

(2) The robot does not stray because it relies not on the sensed information from the sensor 22, but also on to the teaching point.

(3) Accurate control is achieved because the robot is controlled based on a series of the target points. For example, even if an abrupt change exists between the present working point and the present sensing point, the target data of that part is already stored in the memory, so an adequate trace on the work is done.

(4) Highly accurate functioning is achieved. Changes in speed are generally determined by the standard path. With this invention, the standard path is sequentially scanned to instantly identify changes in speed and to flexibly respond to those changes.

(5) Since the information from the sensor 22 about position and posture is represented by a matrix, the present invention can be applied to one-, two-, or three-dimensional correcting functions.

Now a second embodiment of the present invention will be explained. In this embodiment, the robot 10 is controlled by the robot controller with different processes from those of the first embodiment. The robot 10 itself is the same as the one used in the first embodiment.

Figure 15:
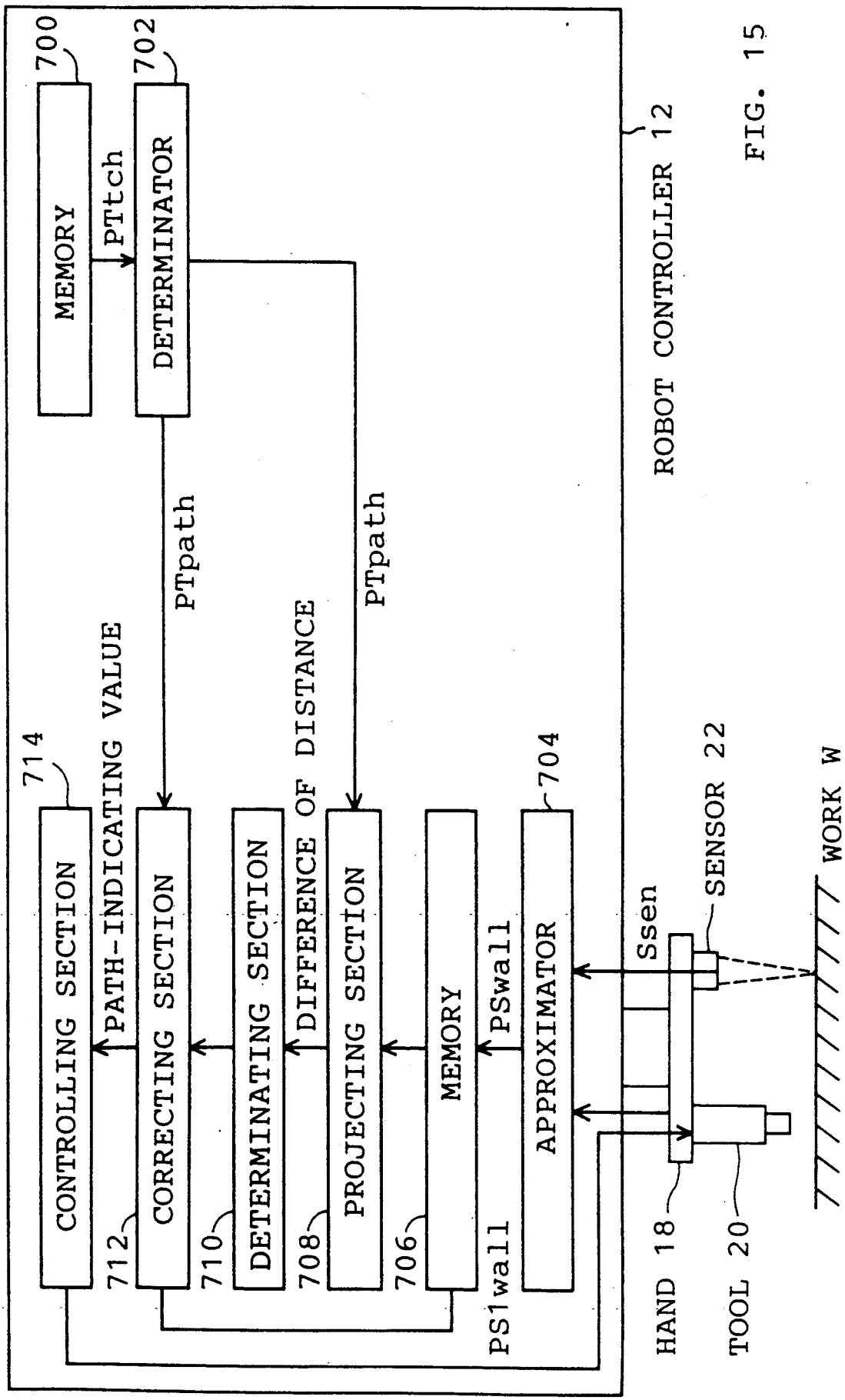
FIG. 15 is a block diagram of the second embodiment.
Figure 16:
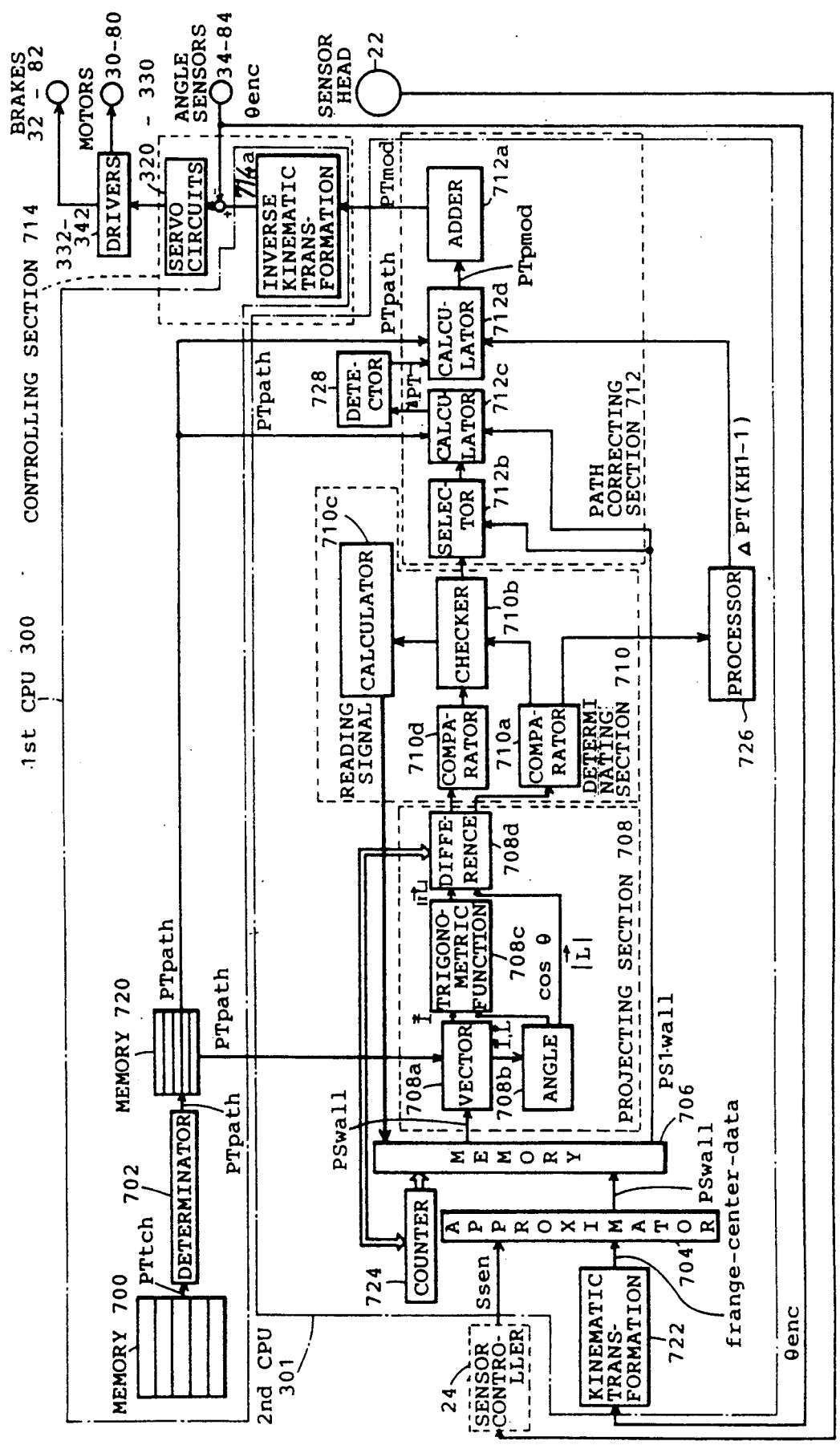
FIG. 16 is a circuit block diagram of the robot controller 12 in the second embodiment.
Figure 17:
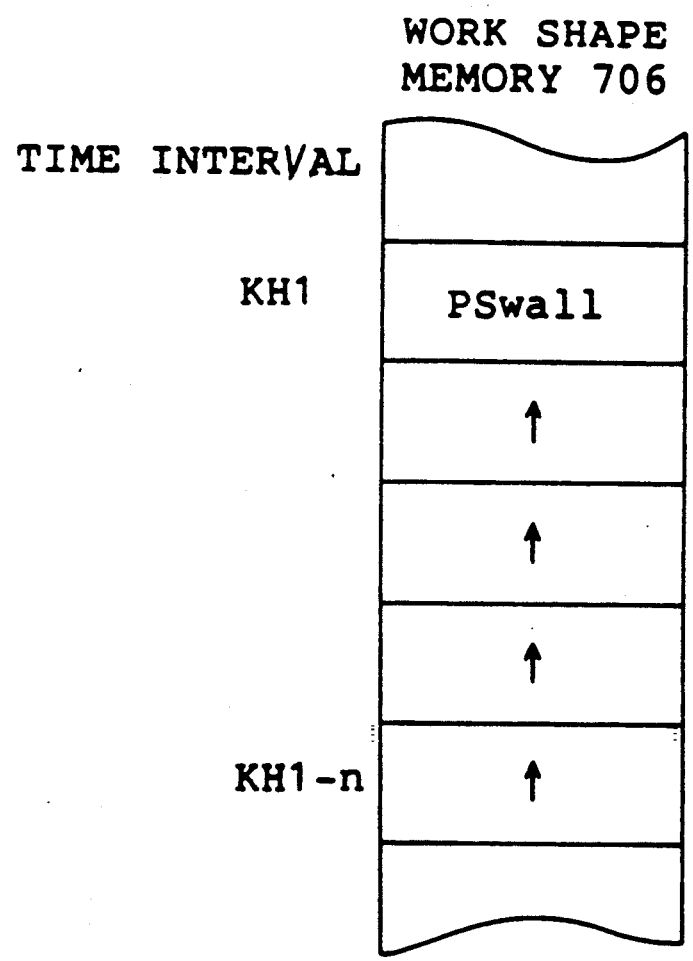
FIG. 17 depicts the work-shape memory 706.

As shown in the block diagram of FIG. 15, the robot controller 12 of this embodiment includes a standard-path memory 700 for previously storing, as a standard path, position data PTtch, which is taught by the teaching operation using the teaching box 14; an interpolation determinator 702 for determining the target data PTpath, (i.e., the interpolating point on the standard path on which the tool 20 moves) based on the position data stored in the memory 700. a work-shape approximator 704 for inputting the sensed data Ssen for a workpiece W and the frange-center-data for the hand 18, and for calculating the work-shape data PSwall; a work-shape memory 706 for storing the word shape data PSwall; an estimated-position projecting section 708 for calculating a plurality of vectors IL, which are projections of PSwall stored in the memory 706 on the vector L spanning from the starting point of the teaching to PTpath; a projection determinating section 710 for selecting the shortest of the vectors IL; a path-correcting section 712 for calculating PTmod and PT from PS1wall corresponding to the selected vector and PTpath determined in the interpolation determinator 702; and a robot-controlling section 714 for moving the tool 20 to the position of PTmod calculated in the correcting section 712. The relationship between the workpiece W, the hand 18, the tool 20, the sensor 22, and the respective amounts is also shown in FIG. 9.

The robot controller 12 of this second embodiment operates as follows.

(1) The memory 706 stores work-point data PSwall from a work-shape approximator 704.

(2) In the projecting section 708, work-point data are projected on the standard path, and the difference in distance between the projected points and the target data is obtained.

(3) In the projection-determinating section 710, a value for PS1wall with the minimum difference in distance is selected.

(4) In the correcting section 712, $\Delta PT$ is obtained from the selected PS1wall, and a new PTmod is calculated from PTpath and PT.

(5) In the robot-controlling section 714, the hand 18 is controlled based on the calculated PTmod.

Figure 18:
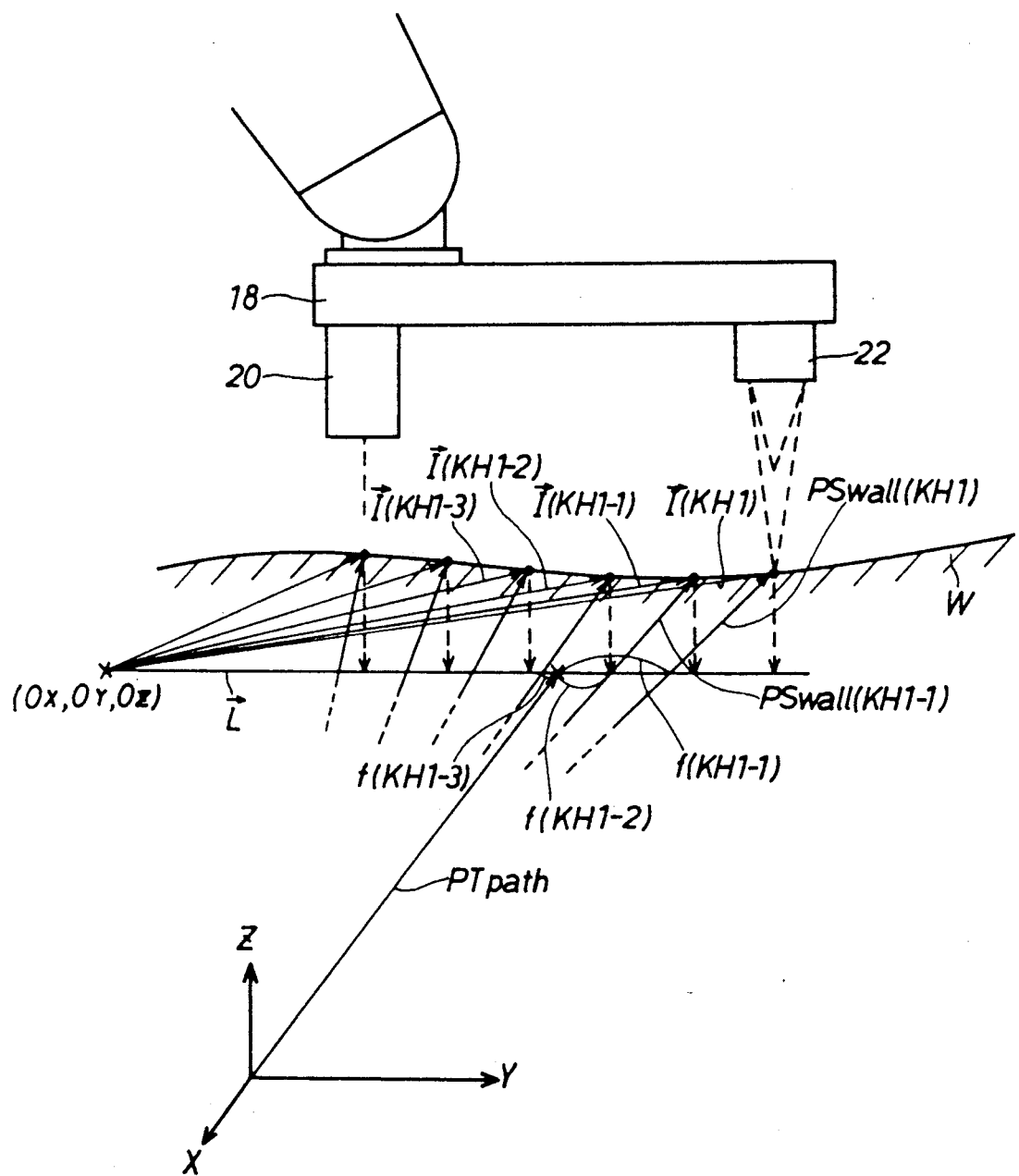
FIG. 18 explains the position relationship between the points used for the memory 706.

FIG. 18 shows the relationships between the respective amounts used in the current processes.

First, PTtch from the memory 700 in the bubble memory 310 is interpolated by the interpolation determinator 702 to calculate PTpath for the tool 20. Then, the calculated PTpath is received in the memory 720 allocated in the preset areas of the RAM 304.

When the correcting section 712 receives the PTpath from the memory 720, $\Delta PT$ and ofs are added to the PTpath by a target offset adder 712a according to formulas (4) and (5) Thus, real modified data PTmod is obtained. The PTmod is received in an inverse kinematic transformation 714a of the robot-controlling section 714, and the robot 10 is controlled as it was in the first embodiment.

Now, the method for calculating the $\Delta PT$ is explained. First, the sensed data Ssen for the workpiece W and the frange-center-data for the hand 18 are received by the approximator 704. The latter is received by way of a kinematic transformation 722 Then in the same way as the first embodiment, PSwall is obtained and stored in the memory 706.

The value PS1wall closest to PTpath is obtained by the following method. Since it takes a long time to calculate the position relationship for of all the work-shape data PSwall, the enclosed interval [a, b], which is the relevant time interval, is first set in the same way as in the first embodiment. The initial value of a is KH1−n, which is the nth time interval before the current time interval KH1, while the initial value of b is the current time interval KH1. n is determined according to working conditions, such as working speed and the distance between the tool and sensor.

A vector calculator 708a in the calculating section 708 determines the vector L spanning from the teaching start point to the PTpath, using formula (29) and the position components (Xpath, Ypath, Zpath) of the target data PTpath and the position components (Ox, Oy, Oz) of the start point data of the teaching operation.

$$L = (Xpath, Ypath, Zpath) - (Ox, Oy, Oz) \quad (29)$$

From the position components (Xwall(a), Ywall(a), Zwall(a)) of PSwall(a) at time interval a read from the memory 706, and the position components (Ox, Oy, Oz) of the start point data of the teaching operation, the vector I(a) spanning from the teaching start point to the PSwall is obtained using formula (30).

$$I(a) = \{Xwall(a), Ywall(a), Zwall(a)\} - (Ox, Oy, Oz) \quad (30)$$

In an angle calculator 708b, the angle $\cos \theta$ between L and I(a) is obtained as in the first embodiment. In the trigonometric function calculator 708c, the length $|IL(a)|$ of the vector IL(a), which is a projection of I(a) on L, is obtained as in the first embodiment using I(a) and $\cos \theta$, which are obtained according to the formulas above.

In a difference calculator 708d, the difference f(a) between $|IL(a)|$ and $|L|$ is obtained as in the first embodiment. Using the data at time interval b stored in the memory 706, f(b) is calculated by repeating the operations from the calculator 708a to the calculator 708d.

Just as in the first embodiment, PS1wall is selected by the determinating section block 710, which has the same construction as the projection determinating section 412 in the first embodiment.

Then, PTmod is calculated by the correcting section 712, which is also the same as in the first embodiment, and sent to the robot controlling section 714.

As in the first embodiment, the robot is controlled by an abnormality processor 726 and an abnormality detector 728 just like those in the first embodiment not to be controlled by abnormal data.

Figure 19:
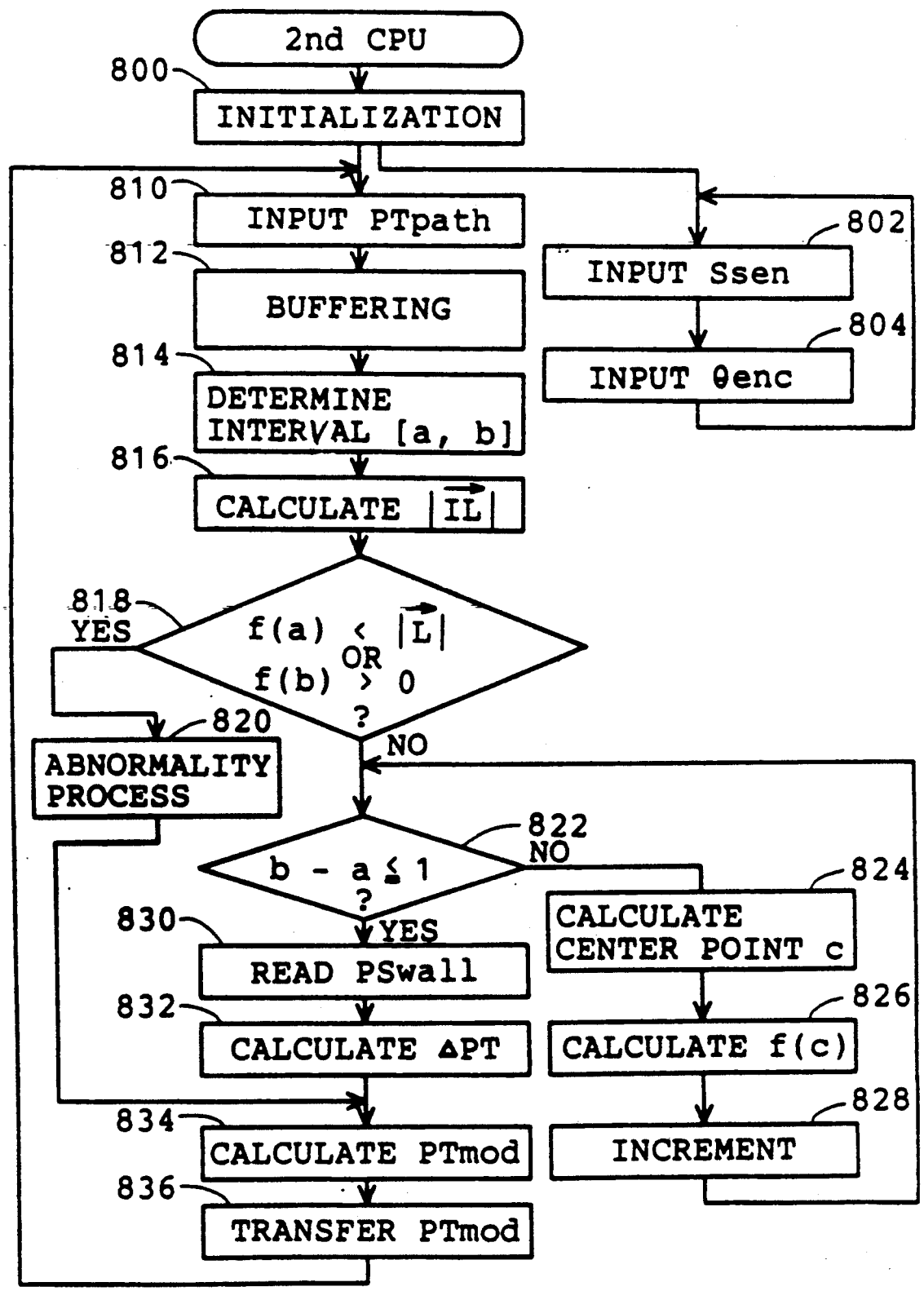
FIG. 19 is a flowchart of the second CPU 301.

The method for executing these processes in the second CPU 301 will be explained; the explanation of the processing in the first CPU 300 is omitted because it is same as the first embodiment. The flowchart in FIG. 19 illustrates the operation of the second CPU 301.

Steps 802 and 804, and steps 810 through 836 are executed in parallel using multi-task processing. Steps 802 and 804 are executed in one time cycle of the sensor controller 24, while steps 810 through 836 are executed in one time cycle of the robot controller 12.

Step 800: The second CPU board is initialized.

Step 802: The position and shape data Ssen of the sensing point is received from the sensor controller 24.

Step 804: Rotation angle data $\theta$enc are simultaneously received from the angle sensors 34, 44, 54, 64, 74, and 84 for each axis when the sensor 22 starts sensing.

Step 810: PTpath is received from the first CPU 300.

Step 812: PSwall is calculated according to the formulas above, and is stored in the area of the memory 706 corresponding to KH1.

Step 814: The search interval [a, b] for selecting PS1wall from the memory 706 is obtained. As described above, the initial values are: a=KH1−n, and b=KH1.

Step 816: PTwall(a) is read from the memory 706 and the vector I(a) spanning from the teaching start point to PSwall(a) and its length $|I(a)|$ are obtained using the formulas above. Further, L spanning from the teaching start point to the target data PTpath is obtained using the formulas above, and $\cos \theta(a)$ made by I(a) and L(a) is obtained using the formulas above.

Then, the vector IL(a), which is a projection of I(a) on L(a), and its length $|IL(a)|$ are obtained according to the formulas above.

Step 818: If at the data-searching interval [a, b], $$f(a) < |L|, \text{ or}$$

$$f(b) > 0,$$

then the control proceeds to step 820, where the abnormality process is executed; otherwise, the control proceeds to step 822.

Step 820: The previously calculated $\Delta PT(KH1-1)$ remains as $\Delta PT$ for the current process, and the control proceeds to step 834.

Step 822: If the work-shape data closest to PTpath is found, the control proceeds to step 830. Otherwise, the control proceeds to step 824. The test condition, $b - a \leq 1$, is satisfied when both end points of the searching interval are at the same point, or when they are adjacent.

Step 824: Since it takes a lot of time to sequentially check the data within the search interval, the enclosing method is used to speed the process. In this way, the center point of the data-searching interval [a, b] is obtained.

Step 826: f(c) is obtained at the center point c.

Step 828: If f(c)>0, c is replaced by a new b. If f(c)<0, c is replaced by a new a. Then the control returns to step 822.

Step 830: PSwall of the time interval selected from the memory 706 is read, and this PSwall is assigned to PS1wall.

Step 832: The difference R-ofs between the selected work-shape data PSwall and PTpath is found using the formulas above. Using R-ofs and correction selector 712b, the correction $\Delta PT$ is found using the formulas above to check for abnormalities with the abnormality detector 728.

Step 834: The modified data PTmod is calculated from PTpath, $\Delta PT$ and ofs.

Step 836: PTmod is transmitted to the first CPU 300, and the control returns to step 810.

The robot of this second embodiment has the same effect as the first embodiment, but in this embodiment, since only the work-shape data PSwall is stored in the memory 706, the memory capacity may be smaller than that of the first embodiment.

What is claimed is:

1. A control system for an industrial robot that tracks a work-shape by moving on a standard path which is determined from position data previously stored in the system, and that has a hand with a tool and a work-shape sensor which is located a predetermined distance in front of the tool and that corrects deviations from the standard path in real-time while the tool is operating, the system comprising:

temporary storage means for receiving sensed data obtained when the tool operates, and for calculating and storing work-shape data using the sensed data;

interpolation determination means for selecting an interpolated point on the standard path as a target position for the tool;

selection means for generating a reference point corresponding to the interpolated point on the standard path, and for selecting the work-shape data that is closest to the reference point;

path correction means for generating target position and posture data for the tool based on the work-shape data from the selection means; and robot control means for controlling the tool to trace a series of points corresponding to the target position and posture data from the path correction means.

2. A control system according to claim 1 in which the selection means comprises:

reference-line calculation means for calculating a reference line from either the work-shape data or the standard path;

projection means for projecting a predetermined projection-start point on the reference line; and reference line selection means for selecting the work-shape data with the least distance between a projected point and a predetermined comparison point on the reference line.

3. A control system according to claim 2 in which the selection means includes means for determining the reference line from the work-shape data; for determining the projection start point from the reference point that is an estimated tool position to be reached by the tool, the estimated tool position being estimated from the standard path and the path actually followed during operation; and for determining the comparison point based on data from the work-shape sensor.

4. A control system according to claim 3 in which the selection means determines the reference line from any one of the group consisting of a vector connecting two adjacent sensed data, a vector connecting two sensed data at a predetermined interval, and a vector connecting the sensed data and tool-end data at the time when the sensed data is detected.

5. A control system according to claim 2 in which the selection means includes means for determining the reference line from the standard path; for determining the projection-start point based on data from the work-shape sensor; and for determining the comparison point from the reference point equivalent to the interpolated point on the standard path.

6. A control system according to claim 1 in which the selection means includes means for determining the reference point from the interpolated point on the standard path, and the selection means using the reference point for selecting the work-shape for correction.

7. A control system according to claim 1 in which the selection means includes means for determining the reference point from the terminal point of a vector where a starting point is a point on the standard path corresponding to the current tool position and the terminal point is the interpolated point on the standard path, when the starting point of the vector is the current tool position, and the selection means using the reference point for selecting the work-shape data for the correction.

8. A control system according to claim 1 in which the temporary storage means includes means for erasing the work-shape data prior to the work-shape data selected by the selection means.

9. A control system according to claim 1 in which the interpolation determination means includes means for reflecting working speed in the interpolated-point determination, the working speed being contained in the position data that produce the standard path.

10. A control system according to claim 1 in which the interpolation determination means includes means for reflecting a path change on the interpolated-point determination, the path change being contained in the position data that produce the standard path.

11. A control system according to claim 1 in which the work-shape sensor on the hand detects the distance between the sensor and the workpiece.

12. A control system according to claim 11 in which the work-shape sensor on the hand detects the direction of a normal vector of the work surface.

13. A control system according to claim 1 in which the work-shape sensor is an optical sensor of the non-contact type for detecting the distance between the sensor and the workpiece and the shape of the workpiece.

14. A control system according to claim 1 in which the system include means for providing the processing path for the workpiece, the position of the tool relative to the workpiece, and the working speed, and for making the standard path from the position data stored in advance during a teaching operation.

* * * * *